United States Patent [19]
Dreyer et al.

[11] Patent Number: 5,889,615
[45] Date of Patent: Mar. 30, 1999

[54] DUAL AXIS RETROREFLECTIVE ARTICLES

[75] Inventors: John F. Dreyer, North Oaks; Kenneth M. White, Oakdale, both of Minn.; Vera L. Lightle, Hudson, Wis.

[73] Assignee: Minnesota Mining and Manufacturing Company, St. Paul, Minn.

[21] Appl. No.: 883,870

[22] Filed: Jun. 27, 1997

[51] Int. Cl.[6] .................................................. G02B 5/122
[52] U.S. Cl. ...................... 359/529; 359/519; 359/522; 359/527; 359/530; 359/533; 359/536; 264/1.9
[58] Field of Search .................................. 359/515–520, 359/522–525, 527–530, 533–536, 548–549, 900; 264/1.9

[56] References Cited

U.S. PATENT DOCUMENTS

| | | |
|---|---|---|
| 285,270 | 9/1883 | Jaeger . |
| 1,097,349 | 5/1914 | Mygatt . |
| 1,287,464 | 12/1918 | Scott . |
| 1,455,306 | 5/1923 | Reilley et al. . |
| 1,552,166 | 9/1925 | James . |
| 1,652,138 | 12/1927 | Boyden . |
| 1,795,952 | 3/1931 | James . |
| 1,996,539 | 4/1935 | Dufay ........................................ 41/19 |
| 2,029,375 | 2/1936 | James . |
| 2,099,671 | 11/1937 | Bairey ...................................... 250/33 |
| 2,123,478 | 7/1938 | Smith . |
| 2,151,144 | 3/1939 | Penny et al. . |
| 2,216,325 | 10/1940 | Ryder ........................................ 89/78 |
| 2,627,784 | 2/1953 | Pellar . |
| 2,741,948 | 4/1956 | Parker . |
| 2,951,419 | 9/1960 | Lemelson . |
| 3,140,340 | 7/1964 | Weber . |
| 3,528,721 | 9/1970 | Londe . |
| 3,551,024 | 12/1970 | Priest, Jr. . |
| 3,712,706 | 1/1973 | Stamm . |
| 3,844,635 | 10/1974 | Atkins . |
| 3,887,268 | 6/1975 | Golden et al. . |
| 3,926,402 | 12/1975 | Heenan ................................. 249/117 |
| 3,999,521 | 12/1976 | Puiello ..................................... 119/96 |
| 4,023,888 | 5/1977 | Klaenhammer et al. . |
| 4,025,159 | 5/1977 | McGrath . |
| 4,066,331 | 1/1978 | Lindner .................................. 350/103 |
| 4,349,498 | 9/1982 | Ellis et al. ................................ 264/81 |
| 4,349,598 | 9/1982 | White ..................................... 448/161 |
| 4,576,850 | 3/1986 | Martens ................................. 428/156 |

(List continued on next page.)

FOREIGN PATENT DOCUMENTS

| | | |
|---|---|---|
| 8324 | 9/1909 | United Kingdom . |
| 423464 | 2/1935 | United Kingdom . |
| 441319 | 1/1936 | United Kingdom . |
| WO 95/11465 | 4/1995 | WIPO .......................... G02B 5/124 |

OTHER PUBLICATIONS

R.W. Wood in *Physical Optics*, 3rd Edition, pp. 44–45 (1934).

JP 60–205501, Patent Abstracts of Japan, vol. 010, No. 064 (p–436), 14 Mar. 1986.

JP 07–128507, Patent Abstracts of Japan, vol. 095, No. 008, 29 Sep. 1995.

*Primary Examiner*—James Phan
*Attorney, Agent, or Firm*—Kevin W. Raasch; Karl G. Hanson

[57] ABSTRACT

Dual axis retroreflective articles and methods of using them are disclosed. The retroreflective articles may combine dual axis retroreflection with three axis retroreflection to provide a steady glow due to the three axis retroreflective portions of the article and also provide intermittent or flashing retroreflection as the plane of retroreflection from the dual axis retroreflector passes through or near the light source. The retroreflective articles may also include dual axis retroreflective structures in combination with sparkling reflective structures, as well as dual axis retroreflective structures in combination with both three axis retroreflective structures and sparkling reflective structures. Methods of use include moving the dual axis retroreflective structures to obtain intermittent or flashing retroreflection.

30 Claims, 15 Drawing Sheets

U.S. PATENT DOCUMENTS

| | | | |
|---|---|---|---|
| 4,582,885 | 4/1986 | Barber | 528/28 |
| 4,588,258 | 5/1986 | Hoopman . | |
| 4,668,558 | 5/1987 | Barber | 428/156 |
| 4,709,580 | 12/1987 | Butts, Jr. et al. | 73/178 |
| 4,775,219 | 10/1988 | Appeldorn et al. . | |
| 4,895,428 | 1/1990 | Nelson et al. . | |
| 4,906,070 | 3/1990 | Cobb, Jr. . | |
| 4,938,563 | 7/1990 | Nelson et al. . | |
| 4,983,436 | 1/1991 | Bailey et al. | 428/40 |
| 5,056,892 | 10/1991 | Cobb, Jr. | 359/831 |
| 5,066,098 | 11/1991 | Kult et al. | 359/540 |
| 5,272,562 | 12/1993 | Coderre | 359/529 |
| 5,450,235 | 9/1995 | Smith et al. | 359/529 |
| 5,491,586 | 2/1996 | Phillips | 359/530 |
| 5,585,164 | 12/1996 | Smith et al. | 428/156 |

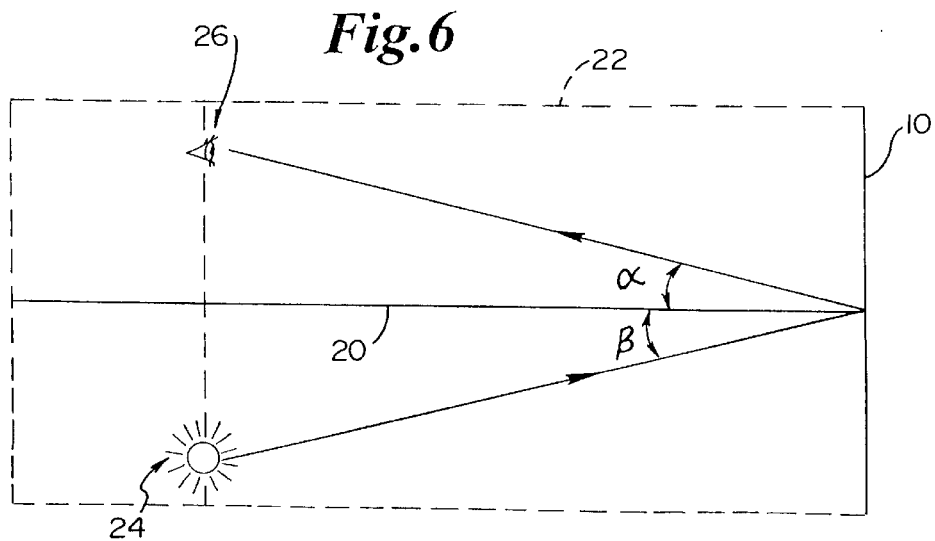
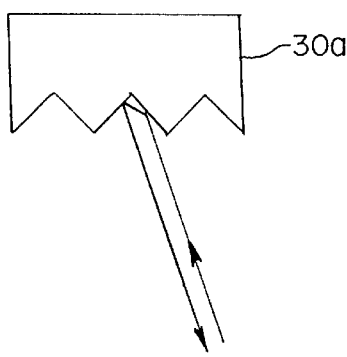
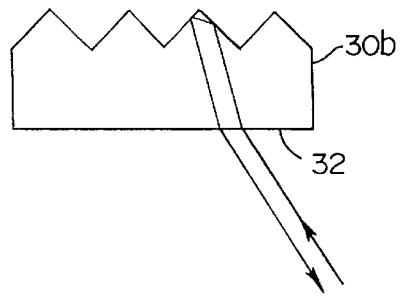
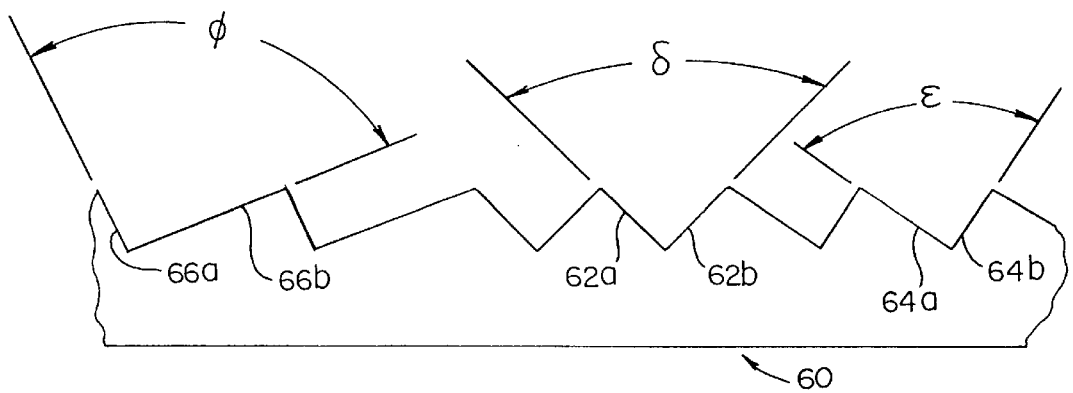

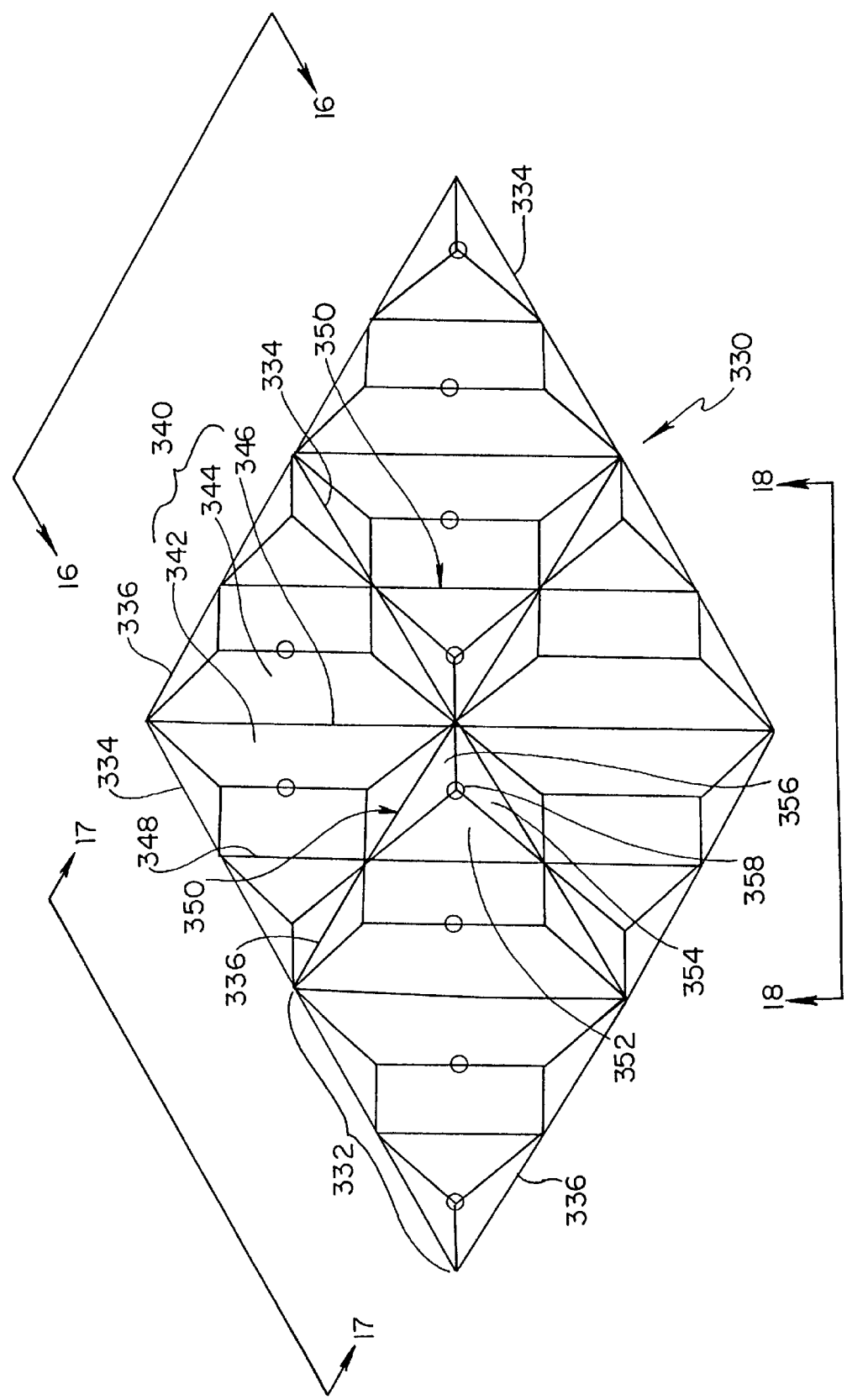

DUAL AXIS RETROREFLECTIVE ARTICLES

FIELD OF THE INVENTION

The present invention relates to the field of structured retroreflective articles. More particularly, the present invention provides structured retroreflective articles providing dual axis retroreflection and, optionally, three axis retroreflection.

BACKGROUND OF THE INVENTION

Nighttime visibility of objects and people is continuing problem, particularly for the operators of vehicles such as trucks and automobiles. Approaches to increasing the nighttime visibility of objects and people can be either passive or active. Active systems provide conspicuity by providing a steady light source, flashing light source, or a combination of steady and flashing light sources. Although active systems do provide conspicuity, they must be provided with energy, typically electrical energy, to provide the desired light. Energy sources are not always available or they may be depleted such that the light sources will not operate. As a result, active systems find limited application for providing long term conspicuity of objects and people.

Passive systems for providing conspicuity include diffuse reflectors and retroreflectors. Retroreflectors can return a significant portion of incident light back towards a light source, such as the headlights of a car or truck. Retroreflectors are typically constructed of beads (see, e.g., U.S. Pat. Nos. 4,025,159 to McGrath; 4,983,436 to Bailey et al.; and 5,066,098 to Kult et al.) or they can include cube corner elements (see, e.g., U.S. Pat. Nos. 5,272,562 to Coderre and 5,450,235 to Smith et al.). With many retroreflectors, the amount of returned light can make the retroreflective article appear as though it included a light source of its own when, in reality, at least a portion of the light directed at the retroreflector from the light source is merely being returned towards the source. Although retroreflectors return a significant portion of light, the incident light is typically from a steady source such as headlights. Steady incident light yields generally steady returned light from the retroreflectors, i.e., the intensity of the returned light does not appreciably vary.

SUMMARY OF THE INVENTION

The present invention provides dual axis retroreflective articles and methods of using them. Dual axis retroreflection (also referred to as two axis retroreflection) provides a number of advantages, particularly when combined with three axis retroreflection and/or flashing reflections.

When retroreflective articles combine dual axis retroreflection with three axis retroreflection, the article will both provide a steady glow due to the retroreflective portions of the article and also provide intermittent or flashing retroreflection as the plane of retroreflection from the dual axis retroreflector passes through or near the light source. That combination of both steady and intermittent illumination increases the conspicuity of an object or person on which the retroreflective article is located. This advantage is particularly apparent when the retroreflective article is located on a pedestrian, because the movement of the pedestrian relative to, e.g., an automobile, will typically cause the plane of retroreflection to repeatedly pass through the vehicle's light source, thereby creating a series of flashes in addition to a steady glow.

In another variation, the present invention provides retroreflective articles including both dual axis retroreflective structures as well as sparkling reflective structures. By "sparkling reflective structures" as used in connection with the present invention, we mean reflective structures that are not retroreflective. Rather, sparkling reflective structures will typically reflect incident light in a direction other than the source, thereby providing a sparkling effect that may be seen by, e.g., an automobile driver (who is in reality somewhat removed from the vehicle's headlights), or by another observer located some distance from the light source, such as the driver of another vehicle. Additionally, the sparkling reflections may also be provided to automobile drivers from streetlights, lighted signs, and other light sources. As a result, the object or person on which the retroreflective article is located may have increased conspicuity to both the operator of one vehicle as well as other observers who may or may not be directing a light source towards the retroreflective article.

In one aspect, the present invention provides a retroreflective article having at least one facet pair including two facets located in generally perpendicular facet planes, the facet planes of each facet pair intersecting along a line of intersection; a plane of retroreflection extending out of the retroreflective article, the plane of retroreflection being perpendicular to both of the facet planes; whereby the retroreflective article exhibits dual axis retroreflection in the plane of retroreflection; and a plurality of three axis retroreflective structures, whereby the retroreflective article exhibits three axis retroreflection of incident light from the three axis retroreflective structures.

In another aspect, the present invention provides a retroreflective article having a completely integral, one piece body; at least one facet pair comprising two facets located in perpendicular facet planes, the facet planes of each facet pair intersecting along a line of intersection; a plane of retroreflection extending out of the retroreflective article, the plane of retroreflection being perpendicular to each of the facet planes; whereby the retroreflective article exhibits dual axis retroreflection in the plane of retroreflection; a plurality of three axis retroreflective structures formed in the body, at least some of the three axis retroreflective structures comprising cube corner retroreflective elements, each of the cube comer retroreflective elements including three mutually perpendicular surfaces meeting in an apex, whereby the retroreflective article exhibits three axis retroreflection of incident light from the three axis retroreflective structures; and a coloring agent generally proximate at least one of the plurality of facet pairs and the plurality of three axis retroreflective structures.

In another aspect, the present invention provides a retroreflective article having at least one facet pair including two facets located in perpendicular facet planes, the facet planes of each facet pair intersecting along a line of intersection; a plane of retroreflection extending out of the retroreflective article, the plane of retroreflection being generally perpendicular to each of the facet planes; whereby the retroreflective article exhibits dual axis retroreflection in the plane of retroreflection; and a plurality of sparkling reflective structures, each of the sparkling reflective structures comprising a plurality of sparkling facet pairs, each of the sparkling facet pairs comprising two sparkling facets located in sparkling facet planes that are not perpendicular, whereby incident light striking the sparkling reflective structures is reflected from the retroreflective article.

In another aspect, the present invention provides a method for improving the conspicuity of an object by providing intermittent dual axis retroreflection of incident light, the method including providing a retroreflective article having at least one facet pair including two facets located in generally perpendicular facet planes, the facet planes of each facet pair intersecting along a line of intersection, each of the facet pairs defining a plane of retroreflection extending out of the retroreflective article, the plane of retroreflection being generally perpendicular to each of the facet planes; whereby the retroreflective article exhibits dual axis retroreflection in the plane of retroreflection; locating the retroreflective article on an object; and providing relative motion between at least two of the retroreflective article, a light source and an observer, whereby at least one of the planes of retroreflection passes proximate the observer and the light source.

These and other features and advantages of the retroreflective articles and methods of using them will be further described below.

BRIEF DESCRIPTION OF THE DRAWINGS

FIG. 6 is a view of the system of FIG. 2, taken along the plane of dual axis retroreflection.

FIG. 7a is a cross-sectional schematic diagram of a first surface dual axis retroreflective article according to the present invention.

FIG. 7b is a cross-sectional schematic diagram of a second surface dual axis retroreflective article according to the present invention.

FIG. 8 is a cross-sectional schematic diagram of a dual axis retroreflective article including canted facet pairs.

FIG. 15 is a plan view of a portion of a retroreflective article including both dual axis retroreflective facet pairs and cube corner retroreflective elements.

DETAILED DESCRIPTION OF THE PREFERRED EMBODIMENTS

The present invention relies on dual axis retroreflection to increase conspicuity. The dual axis retroreflection can be used alone and in combination with three axis retroreflection, sparkling reflection, and/or specular reflection.

The present invention relies on retroreflection which is a subset of reflection in general. The phenomenon of reflection can be separated into three basic categories, i.e., specular, diffuse and retroreflection. Specular reflection is seen in connection with, e.g., common mirrors, etc., while diffuse reflection is seen in connection with, e.g., white painted surfaces, etc. Retroreflection occurs when incident light is reflected directly or nearly directly back towards the light source from an object.

Retroreflection itself can be separated into two categories, i.e., spatial or three axis retroreflection and dual axis or two axis retroreflection. The most common usage of the term "retroreflection" assumes three axis retroreflection. Three axis retroreflection can be provided by a number of different optical structures. Two common three axis retroreflective structures are commonly referred to a cube corner elements and beaded retroreflectors. The characteristics of such retroreflectors have been widely studied and reported and will not be discussed in detail here. Briefly, however, three axis retroreflectors will retroreflect at least a portion of incident light within a "cone" of retroreflectivity located about the optical axis of the retroreflectors. The dimensions and shape of the cone of retroreflectivity can vary and the optical axis can be skewed in one direction or another by manipulation of the retroreflective structures and these variations will be known to those skilled in the art. At a minimum, however, three axis retroreflectors will retroreflect at least a portion of incident light from a source that can move in any direction relative to the optical axis of the retroreflectors.

Dual axis or two axis retroreflection is another useful phenomenon that is exploited in the present invention to increase the conspicuity provided by retroreflective articles. Dual axis retroreflection will be described with reference to one structure below, although it will be understood that any structure that provides the desired dual axis retroreflectivity could be substituted for the disclosed structures and objects.

Figure 1:
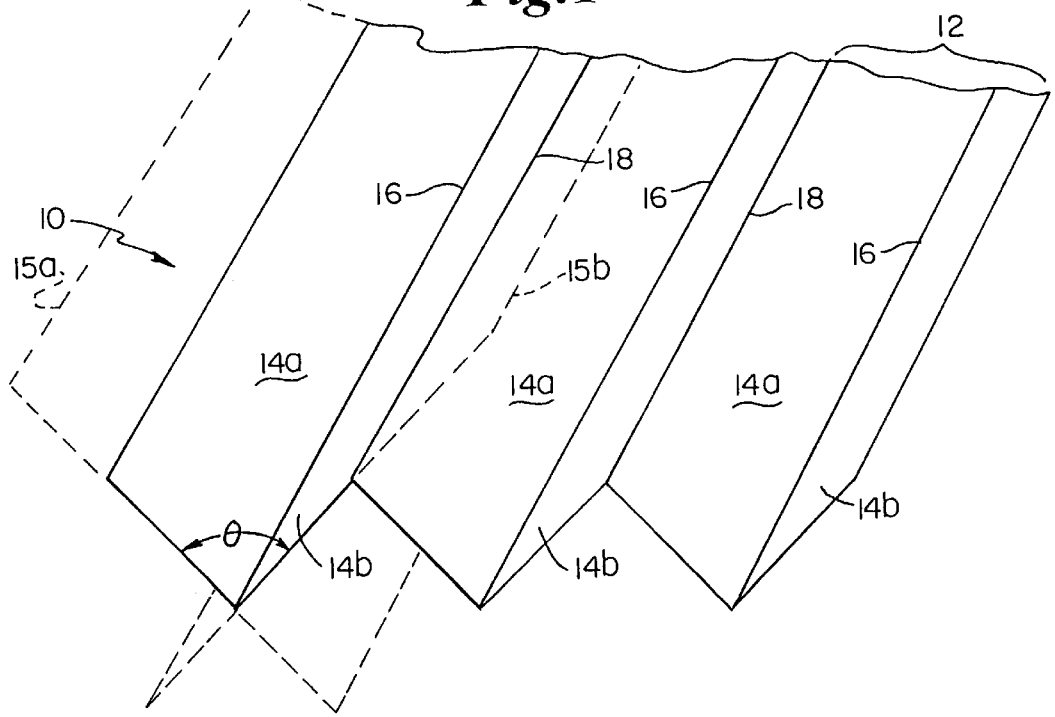
FIG. 1 is a perspective view of a dual axis retroreflective system according to the present invention.

FIG. 1 is a perspective view of one dual axis retroreflective article 10 according to the present invention. The retroreflective article 10 includes an array of retroreflective facet pairs 12 including two opposing facets 14a and 14b formed in a surface of the retroreflective article 10. The facets 14a and 14b are preferably located in facet planes 15a and 15b, respectively, that are oriented perpendicular to each other. As a result, the facets 14a and 14b in each facet pair 12 form an included angle θ of 90 degrees.

In the embodiment depicted in FIG. 1, the facets 14a and 14b meet or intersect along a line of intersection 16. It will, however, be understood that the facets 14a and 14b could be terminated short of the line of intersection 16 in which case the facet pair 12 would be considered truncated as discussed more fully below. In the retroreflective article 10, adjacent facet pairs 12 meet along a peak 18 where the adjacent facets in the adjacent facet pairs 12 intersect.

Figure 2:
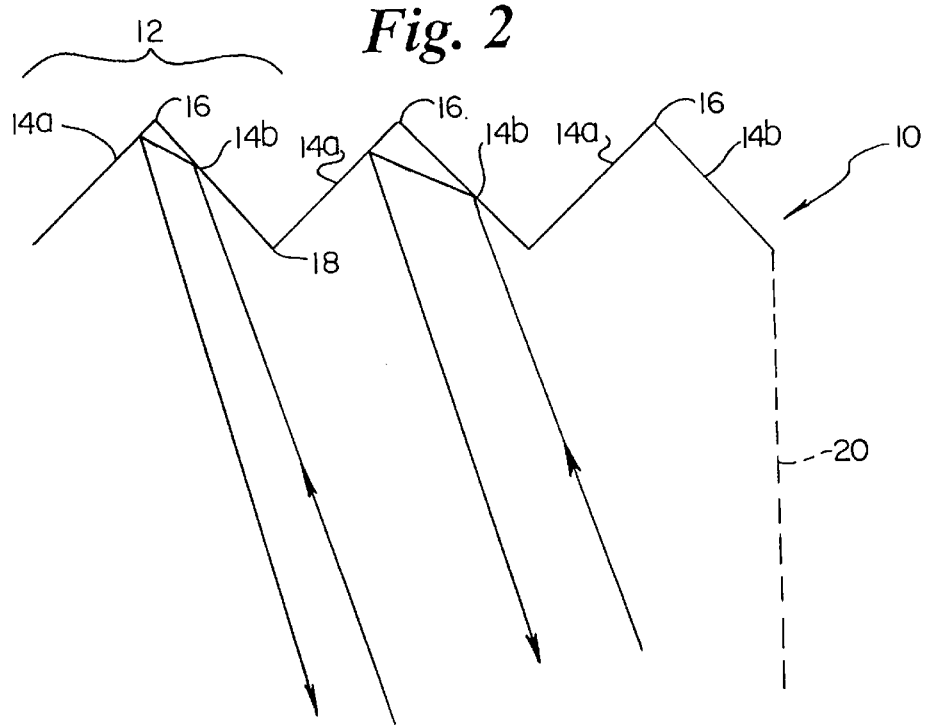
FIG. 2 is a view of the system of FIG. 1 taken along lines 16.
Figure 3:
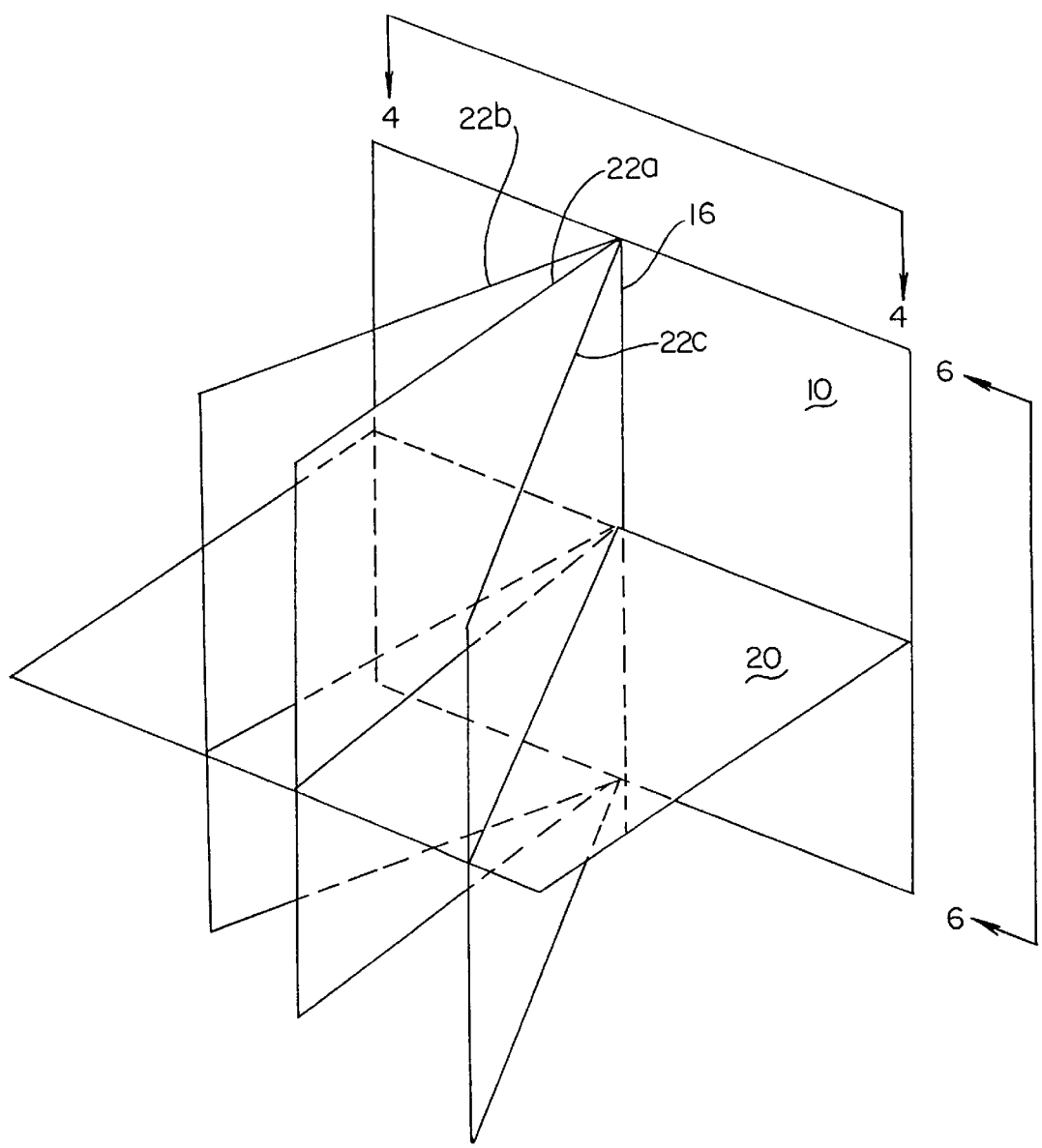
FIG. 3 is a different perspective view of the dual axis retroreflective system of FIG. 1.

Each of the facet pairs 12 and their orientation in the retroreflective article 10 provide dual axis retroreflectivity. The concept of dual axis retroreflectivity can best be explained with reference to FIGS. 2 and 3, where FIG. 2 is a view of the retroreflective article 10 along the lines of intersection 16 and the peaks 18 and FIG. 3 is a different perspective view of the retroreflective article 10 than is depicted in FIG. 1. By dual axis retroreflectivity, we mean that each facet pair 12 will retroreflect incident light provided that the incident light travels towards the facet pair 12 along a plane of retroreflection 20 that is perpendicular to both of the facets 14a and 14b in a given facet pair 12. As a result, plane of retroreflection 20 is also perpendicular to the line of intersection 16 formed by the facet pair 12 (with the understanding that the line 16 may be imaginary if the facets 14a and 14b do not physically intersect). As a result, the facet pairs 12 will retroreflect a significant amount of light that strikes the facets 14a and 14b along that plane of retroreflection 20 and the retroreflected light will also travel along the plane of retroreflection 20. Light that approaches the retroreflective article 10 off of a plane of retroreflection like plane 20 will not typically be retroreflected.

Figure 4:
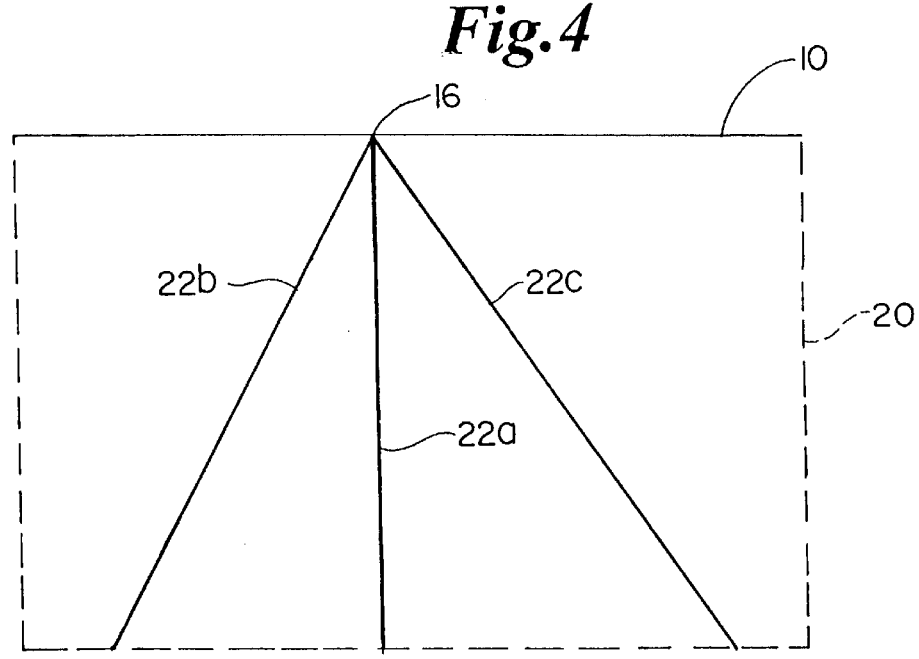
FIG. 4 is a view of the system depicted in FIG. 3 taken along line 16.
Figure 5:
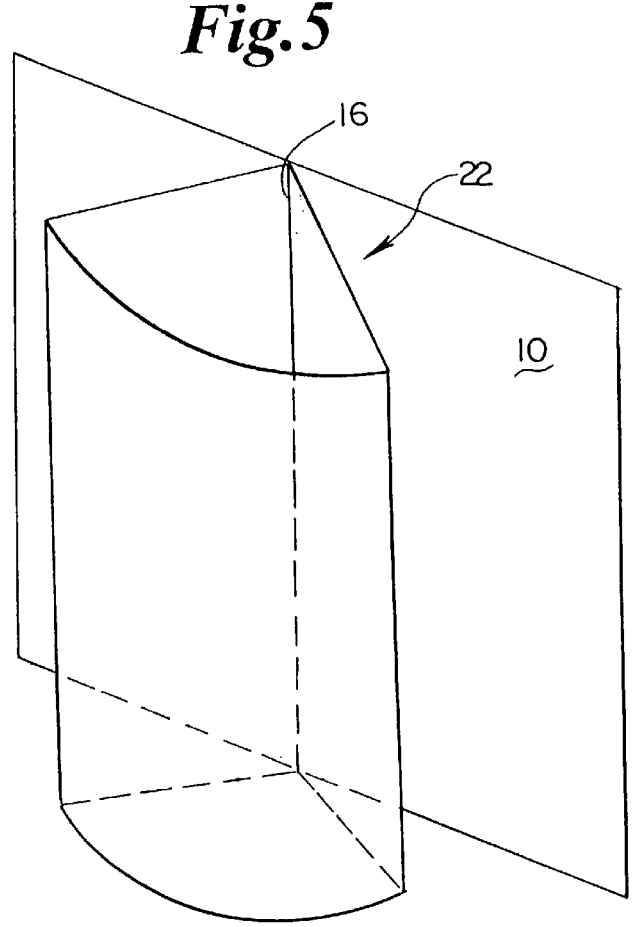
FIG. 5 is a perspective view of the system of FIG. 3, depicting the volume occupied by the specular reflective planes for a given dual axis retroreflective facet pair.

Dual axis retroreflection also includes a specular component as illustrated in connection with FIGS. 3–6 in which the retroreflective article 10 is represented as a planar article (i.e., without individual facet pairs 12 as shown in FIGS. 1 and 2) to simplify its illustration. FIG. 3 is a perspective view of the system of FIGS. 1 and 2 and FIG. 4 is a view of the retroreflective article 10 taken along line 4—4 in FIG. 3. In addition to the dual axis retroreflection provided in the plane of retroreflection 20 described above, each of the facet pairs 12 of the retroreflective article 10 also provide specular planes of reflection 22a, 22b, and 22c (referred to commonly as 22). The specular planes of reflection 22 for each facet pair 12 are defined by the line of intersection 16 for each of the facet pairs 12. In other words, the line of intersection 16 lies in each of the specular planes of reflection 22 for a given facet pair 12. Although only three individual planes of reflection 22a, 22b and 22c are depicted in FIGS. 3 and 4, retroreflective article 10 actually will exhibit a plurality of specular planes of reflection 22 emanating from each of the lines of intersection 16 and the space occupied by all of the specular planes of reflection 22. That space can be described as a segment or section of a circular cylinder of infinite radius as shown in FIG. 5. Any plane that lies within that space and which contains all of line of intersection 16 is a specular plane of reflection 22 for the given facet pair 12.

FIG. 6 is a view of the retroreflective article 10 taken along line 6—6 in FIG. 3 in which the plane 20 of dual axis retroreflection is depicted as a line along with the retroreflective article 10 (which also appears as a line in FIG. 6). Light incident on the retroreflective article 10 along any one of the specular planes of reflection 22 is reflected back along the specular plane 22 at an angle $\alpha$, that is equal but opposite to the angle $\beta$ of incidence. FIG. 6 includes a light source 24 and observer 26, neither of which is located on the plane 20 of dual axis retroreflection for the given facet pair. The light source 24 and observer 26 are both, however, located on the same specular plane 22 of reflection. In addition, the light source 24 is located about the same angle $\beta$ below the plane 20 as the angle $\alpha$ at which the observer 26 is located above the plane 20 of dual axis retroreflection. As a result, light from the light source 24 will be reflected off of the retroreflective article 10 towards the observer 26.

Retroreflective articles 10 that exhibit dual axis retroreflectivity work well with light sources and observers that move in two axes that define the plane of retroreflection 20. As a result, dual axis retroreflection can also be referred to as two axis retroreflection. Any movement in a third axis, i.e., off of the plane of retroreflection 20, will result in reflection of the light in a direction away from the source. If, however, the observer and the light source are both located in one of the specular planes of reflection 22 as described above and are located at equal, but opposite, angles above and below the plane of retroreflection 20, then the observer will experience a bright reflection of the light incident on the retroreflective article 10 from the light source. The reflections seen in the specular planes of reflection 22 are not dispersed over a cone as are reflections from conventional three-axis retroreflection and, as a result, the reflections in the specular planes are brighter than typical retroreflection from three axis retroreflectors.

The intermittent nature of dual axis retroreflection can be explained with reference to FIG. 6. Movement of the retroreflective article 10 relative to a fixed point causes the plane of retroreflection 20 to move. If, for example, the light source 24 and the observer 26 are held in a constant (but different) positions and are also located in a specular plane 22 while the retroreflective article 10 is moved, the plane of retroreflection 20 can intermittently pass through or near the observer 26. In those instances when the conditions set forth above are satisfied, i.e., the light source 24 and observer 26 are located at equal but opposite angles above and below the plane of retroreflection 20 and are also located on the plane of reflection 22, the observer 26 will experience flashes or intermittent reflection of the incident light. For those instances when the light source 24 and the observer 26 are located in close proximity (or when the distances between the retroreflective article 10 and the observer 26 are great), the observer 26 can also experience intermittent retroreflection when the plane of retroreflection 20 passes through the observer 26.

Intermittent reflection or retroreflection can also be experienced by an observer 26 when the retroreflective article 10 is stationary (thereby causing its plane of retroreflection 20 and specular planes of reflection 22 to also be stationary). In that situation, intermittent retroreflection could be experienced by an observer 26 moving into and out of the plane of retroreflection 20 when the light source 24 is located close to the observer 26 or if the light source 24 and/or observer 26 are located at relatively large distances from the retroreflective article 10. Intermittent reflection could be experienced by an observer if the light source 24 and observer 26 become located in one of the specular planes of reflection 22 at equal but opposite angles above and below the plane of dual axis retroreflection 20.

The descriptions thus far have focused on the surfaces of the facets, e.g., 14a and 14b, of the facet pairs of dual axis retroreflective articles 10. It should be understood that dual axis retroreflection can be accomplished through either first surface reflection or through second surface reflection. These concepts are illustrated in FIGS. 7a and 7b. First surface reflection occurs when the incident light is reflected from the first surface it strikes as seen in connection with FIG. 7a. Second surface reflection occurs when light is reflected from the second (or third, fourth, etc.) surface it strikes as illustrated in FIG. 7b. In first surface reflection, the body 30a of the retroreflective article is located behind the reflective surface, while in second surface reflection, the incident light passes through a first surface 32 (where it is typically refracted), travels through the body 30b and strikes the second surface where it is reflected. The reflections at the second surface can be accomplished through the use of reflective materials, through total internal reflection, or through a combination thereof. Either first surface reflection or second surface reflection (or combinations thereof) can be used in manufacturing retroreflective articles according to the present invention.

Although perfect retroreflective structures would return all of the reflected light at an angle of 180 degrees to incident light, those skilled in the art understand that some minor variations in the direction of returned light are possible. In other words, the returned light may travel along a path that, e.g., forms an angle of 178 degrees or perhaps 181 degrees with the path of the incident light. These variations can be caused by deviations in the orientation of the facet pairs, e.g., inconsistencies in the manufacturing of the facet pairs may cause them to vary slightly from perfect perpendicular orientations or variations purposely introduced into the design of the facet pairs that cause at least some of them to vary slightly from perfectly perpendicular orientations. Typically, however, the returned light will fall within a useful range of angles. This "range" of retroreflection may, in fact, be advantageous where, for example, the viewer and the light source are not located at the same point such as in a vehicle where the headlights operate as the light source and the driver's eyes are located a given distance away from the lights. As used in connection with the present invention, retroreflection will include both perfect retroreflection as well as imperfect retroreflection, provided that a significant portion of the returned light is generally directed at or near to the source of the incident light.

Another variation that may be used in dual axis retroreflective articles according to the present invention is the use of canted or tilted facet pairs. Just as cube corner retroreflective elements can be canted, it should also be understood that the facets of facet pairs in a dual axis retroreflective article can also be canted. In the case of dual axis retroreflective articles, canting of the facets results in changing the functional range of incident angles over which the facet pairs will retroreflect in their respective planes of dual axis retroreflection. An example of a retroreflective article 60 with symmetric (i.e., non-canted) and canted facet pairs is depicted in the cross-sectional view of FIG. 8. The facets 62a and 62b are referred to as symmetric because the facets are the same size and they exhibit symmetry about their line of intersection. The functional range over which facets 62a and 62b can retroreflect light is represented by angle δ. The facets 64a and 64b are canted to the left as seen in FIG. 8 and, as a result, their functional range is represented by angle ε as shown in FIG. 8. That range is tilted or canted towards the left as are the facets 64a and 64b. Facets 66a and 66b are canted to the right and, as a result, their functional range, as represented by angle φ, is also canted to the right. Facets 66 are canted more severely than are the facets 64 which results in a more severely canted functional range. Although FIG. 8 depicts one combination of canted and symmetric facet pairs, it will be understood that many different combinations of canted facet pairs or canted and symmetric facet pairs could be provided in dual axis retroreflective articles according to the present invention to obtain the desired performance parameters.

A variety of retroreflective articles will now be described to illustrate the principles and features of dual axis retroreflective articles according to the present invention. It should, however, be understood that the invention is not to be limited to the illustrative embodiments described herein.

Figure 9:
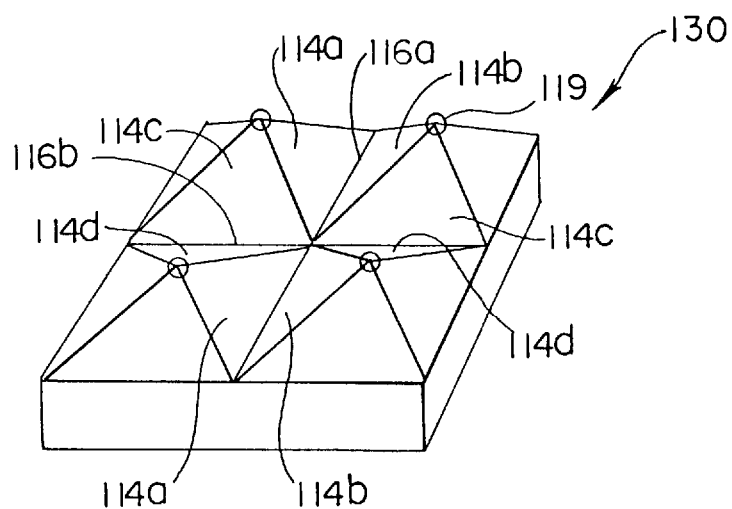
FIG. 9 is a perspective view of a dual axis retroreflective article according to the present invention.

The retroreflective articles described above have included only a single set of parallel planes of dual axis retroreflection emanating from a single set of facet pairs. FIG. 9 depicts another dual axis retroreflective article 130 manufactured according to the present invention that includes two planes 120a and 120b of dual axis retroreflection. The retroreflective article 130 includes an array of pyramid-like structures defined by facets 114a, 114b, 114c, and 114d. The facets 114 of each pyramid meet at an apex 119. For clarity, each of the apexes 119 extending out of the retroreflective article 130, i.e., towards the viewer, will be circled while those recessed within the article 130 will not be circled. That convention will be maintained throughout the remainder of the figures.

The retroreflective article 130 includes a first line of intersection 116a about which a first set of facets 114a and 114b are located, with the facets 114a and 114b being arranged in perpendicular planes. As a result, the first set of reflective facets 114a and 114b define a first plane of dual axis retroreflection 120a in the same manner as described above. The retroreflective article 130 also includes a second line of intersection 116b about which a second set of facets 114c and 114d are located, with the facets 114c and 114d being arranged in perpendicular planes. As a result, the second set of reflective facets 114c and 114d define a second plane of dual axis retroreflection 120b. Because lines of intersection 116a and 116b are perpendicular to each other, the two planes of dual axis retroreflection 120a and 120b are also perpendicular, but it should be understood that the planes 120a and 120b need not necessarily be perpendicular to each other.

Figure 10:
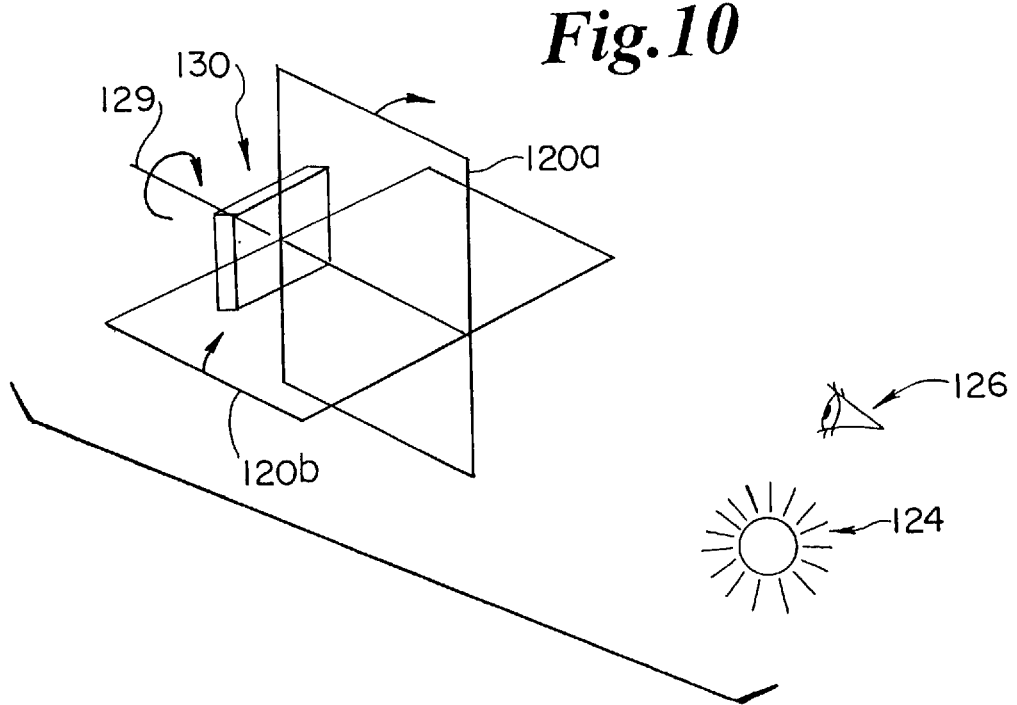
FIG. 10 is a schematic diagram of one method of using the dual axis retroreflective article of FIG. 9.

One method of using a dual axis retroreflective article 130 is depicted in FIG. 10 in which the article 130 is rotated about an axis 129 passing through the surface of article 130 in which the facets 114 are located. The planes of dual axis retroreflection 120a and 120b are also depicted in FIG. 10 to illustrate that as the retroreflective article 130 is rotated about axis 129, those planes 120a and 120b are also rotating about the axis 129. As a result, the planes 120a and 120b also pass through a light source 124 and an observer 126, thereby providing intermittent retroreflection of light from the source 124 that may be experienced by the observer 126 if the light source 124 and 126 are sufficiently close together. Although not shown for the sake of clarity, it will be understood that retroreflective article 130 includes specular planes of reflection that are also rotating with retroreflective article 130 and passing through the light source 124 and observer 126, thereby providing intermittent reflection of the light from the source 124 that may be experienced by the observer 126. The method of use depicted in FIG. 10 may find particular use in connection with any rotating objects such as wheels, etc. to improve the conspicuity of the rotating objects.

Figure 11:
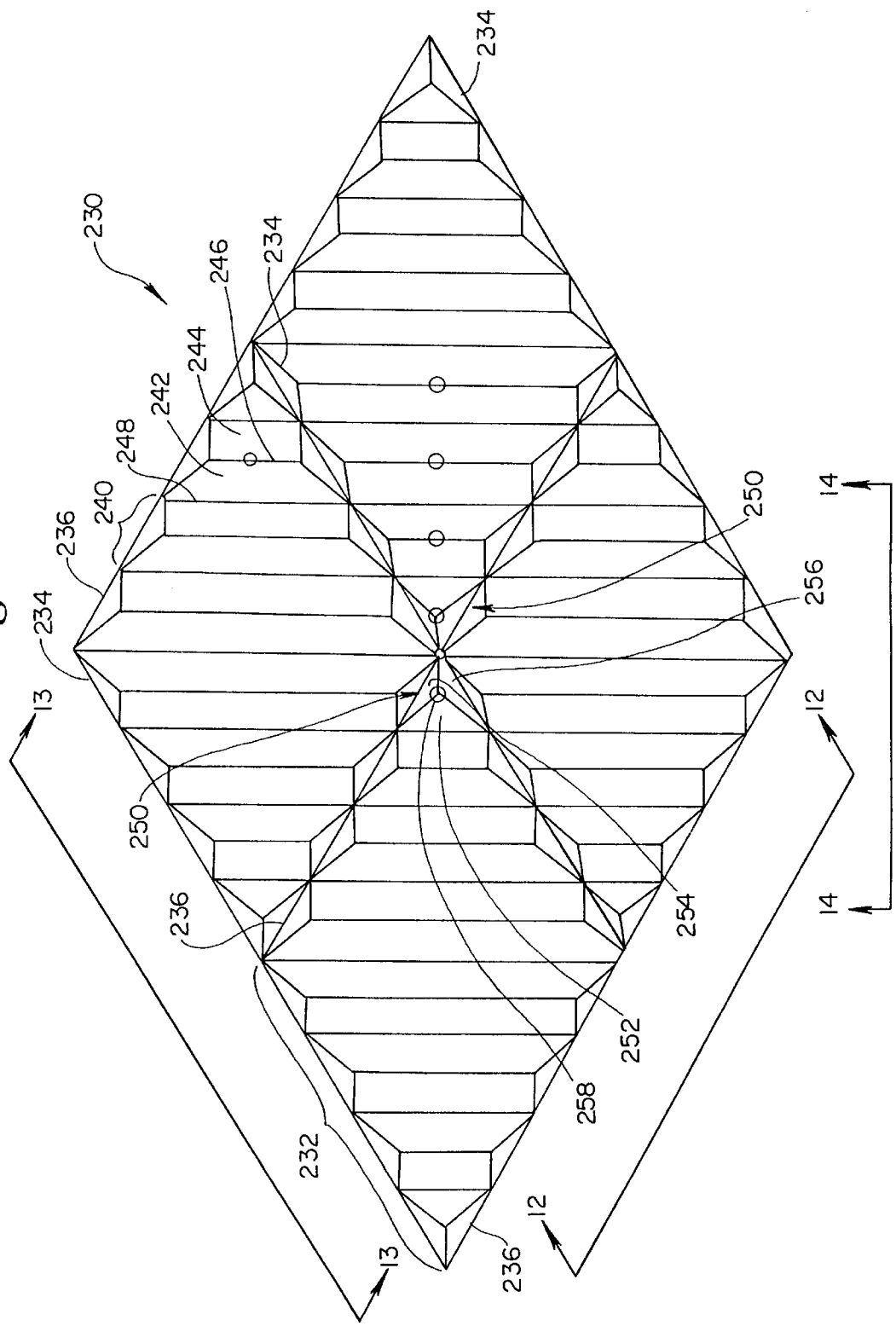
FIG. 11 is a plan view of one dual axis retroreflective article according to the present invention that includes cube corner retroreflective elements.

FIG. 11 is a plan view of another retroreflective article 230 manufactured according to the present invention. The retroreflective article 230 includes both retroreflective facet pairs and retroreflective cube corner elements to provide both dual axis retroreflection and full three axis retroreflection. Retroreflective article 230 includes a plurality of facet pairs 240 formed by opposing facets 242 and 244 formed in a surface of the retroreflective article 230. The facets 242 and 244 are preferably located in facet planes that are oriented perpendicular to each other. As a result, the facets 242 and 244 in each facet pair 240 form an included angle of 90 degrees. In the embodiment depicted in FIG. 10, the facets 242 and 244 meet or intersect along a line of intersection 246. It will, however, be understood that the facets 242 and 244 could be terminated short of the line of intersection 246 in which case the facet pair 240 would be considered truncated as discussed more fully below. In the retroreflective article 230, adjacent facet pairs 240 meet along a valley 248 where the adjacent facets in the adjacent facet pairs 240 intersect. The plurality of facet pairs 240 in the retroreflective article 230 provide dual axis retroreflectivity as discussed above.

The retroreflective article 230 includes four areas or sections 232 formed between adjacent pairs of lines 234 and lines 236. At the intersection of each group of four sections 232, two cube corner retroreflective elements 250 are formed, each having three generally mutually perpendicular surfaces 252, 254, and 256 that meet at an apex 258. The exact construction and operation of cube corner elements 250 will not be discussed in great detail herein as those details will be well known to those skilled in the art of cube corner retroreflective elements.

Among those construction details are canting of the optical axes of the cube corner retroreflective elements 250. In general, the cube corner retroreflective elements 250 depicted in FIG. 10 have optical axes that are normal to the plane of the retroreflective article 230. Similarly, the dual axis retroreflective facet pairs 240 can also be tilted as described more fully below. It is, however, known that variations in the construction of cube corner retroreflective elements can tilt or move the optical axis of a given cube corner retroreflective element. One example is provided in, example, U.S. Pat. No. 4,588,258 to Hoopman. The present invention should be considered to include retroreflective articles including canted cube corner retroreflective elements as well as those with "normal" optical axes. Also considered within the scope of the present invention are retroreflective cube corner element arrays with tailored divergence profiles as discussed in, e.g., U.S. Pat. No. 4,775,219 to Appeldorn et al.

The function that cube corner retroreflective elements 250 do provide in article 230 is their ability to retroreflect light approaching the article 230 in three axes. In other words, a light source can be located along any axis relative to the retroreflective article 230 and the elements 250 will retroreflect at least some of the incident light from that source (with some limitations as will be known to those skilled in the art). As a result, the cube corner retroreflective elements 250 will retroreflect light that the dual axis retroreflective facet pairs 240 will also retroreflect. More importantly, however, the cube corner retroreflective elements 250 will also retroreflect light from a source that is not located in the plane of retroreflection, i.e., when the facet pairs 240 are not retroreflecting.

The result of the combination of dual axis retroreflective facet pairs 240 and three axis retroreflective cube corner elements 250 is that the retroreflective article 230 will retroreflect light in both a steady fashion from the cube corner retroreflective elements 250 and will also retroreflect light that is incident in the plane of retroreflection. The practical result is that as the retroreflective article 230 is moved relative to a light source, the retroreflective article 230 will, for a steady or unchanging light source, exhibit steady retroreflection from the cube corner retroreflective elements 250 and flashes or intermittent retroreflection from the facet pairs 240 as the plane of retroreflection passes through the light source. This combination of steady retroreflection and intermittent retroreflection can significantly improve the conspicuity of an object on which the retroreflective article 230 is located.

Figure 12:
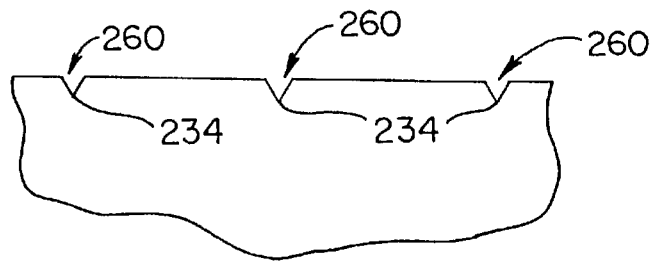
FIG. 12 is a schematic diagram of the machining pattern cut from the direction indicated by line 12—12 in FIG. 11.
Figure 13:
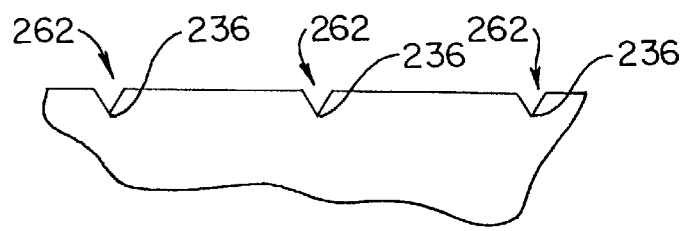
FIG. 13 is a schematic diagram of the machining pattern cut from the direction indicated by line 13—13 in FIG. 11.
Figure 14:
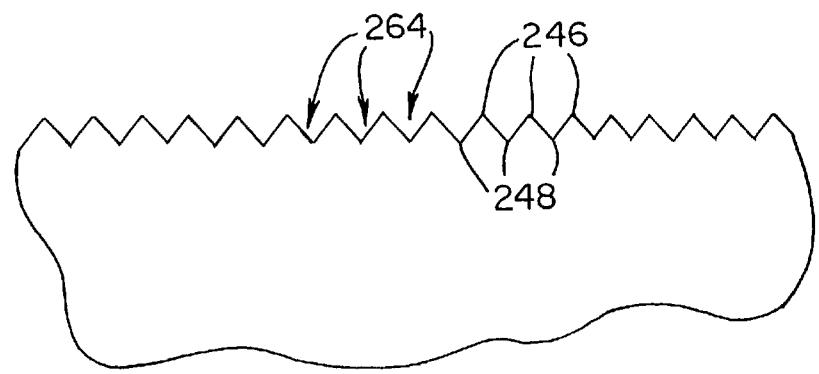
FIG. 14 is a schematic diagram of the machining pattern cut from the direction indicated by line 14—14 in FIG. 11.

FIGS. 12–14 depict the cuts or grooves that could be machined into a substrate to either directly machine a retroreflective article 230 or to form a mold for replicating retroreflective articles 230. FIG. 12 depicts the spaced grooves 260 that would be formed along lines 234 in retroreflective article 230. FIG. 13 depicts the spaced grooves 262 that would be formed along lines 236 in retroreflective article 230. FIG. 14 depicts the grooves 264 that would be formed along lines of intersection 246 and valleys 248 in retroreflective article 230. The tool used to form grooves 264 preferably has a tip with a 90 degree angle to form the perpendicular facets 242 and 244 in the facet pairs 240. The angular relationships between lines 234, 236 and 246 can be determined from the needs of the cube corner retroreflective elements 250 as will be known to those skilled in the art.

The ratio of dual axis retroreflection to three axis retroreflection can be adjusted as desired by varying the design of retroreflective articles according to the present invention. One method of varying the ratio of dual axis retroreflection to three axis retroreflection is to vary the surface area of the retroreflective article occupied by the cube corner retroreflective elements used in the retroreflective articles according to the present invention. FIGS. 15–18 depict one alternate design of a retroreflective article 330 according to the present invention that incorporates a larger area of cube corner retroreflective elements 350. As a result, retroreflective article 330 will typically appear to glow brighter than will retroreflective article 230, although retroreflective article 230 will typically exhibit intermittent retroreflection that is of a greater intensity than retroreflective article 330.

Retroreflective article 330 is best seen in FIG. 15 and includes a plurality of facet pairs 340 formed by opposing facets 342 and 344 formed in a surface of the retroreflective article 330. The preferred facet pairs 340 provide dual axis retroreflectivity as discussed above. The facets 342 and 344 are preferably located in facet planes that are oriented perpendicular to each other. As a result, the facets 342 and 344 in each facet pair 340 form an included angle of 90 degrees. In the embodiment depicted in FIG. 15, the facets 342 and 344 meet or intersect along a line of intersection 346. It will, however, be understood that the facets 342 and 344 could be terminated short of the line of intersection 346 in which case the facet pair 340 would be considered truncated as discussed more fully below. In the retroreflective article 330, adjacent facet pairs 340 meet along a valley 348 where the adjacent facets in the adjacent facet pairs 340 intersect.

The retroreflective article 330 depicted in FIG. 15 includes four areas or sections 332 formed between adjacent pairs of lines 334 and lines 336. At the intersection of each group of four sections 332, two cube corner retroreflective elements 350 are formed, each having three mutually perpendicular surfaces 352, 354, and 356 that meet at an apex 358. The exact construction and operation of cube corner elements 350 will not be discussed in great detail herein as those details will be well known to those skilled in the art of cube corner retroreflective elements. The function that cube corner retroreflective elements 350 do provide in article 330 is their ability to retroreflect light in three axes. In other words, a light source can move in any axis relative to the retroreflective article 330 and the elements 350 will retroreflect the incident light from that source (with some limitations as to functional range as will be known to those skilled in the art). As a result, the cube corner retroreflective elements 350 will retroreflect light that the dual axis retroreflective facet pairs 340 will also retroreflect. More importantly, however, the cube corner retroreflective elements 350 will also retroreflect light from a source that is not located in the plane of retroreflection, i.e., when the facet pairs 340 are not retroreflecting.

As discussed with respect to retroreflective article 230, the combination of dual axis retroreflective facet pairs 340 and three axis retroreflective cube corner elements 350 is that the retroreflective article 330 will retroreflect light in both a steady fashion from the cube corner retroreflective elements and will also retroreflect light that is incident in the plane of retroreflection. The practical result is that as the retroreflective article 330 is moved relative to a light source, the retroreflective article 330 will, for a steady or unchanging light source, exhibit steady retroreflection from the cube corner retroreflective elements 350 and flashes or intermittent retroreflection from the facet pairs 340 as the plane of retroreflection moves. This combination of steady retroreflection and intermittent retroreflection can significantly improve the conspicuity of an object on which the retroreflective article 330 is located.

Figure 15A:
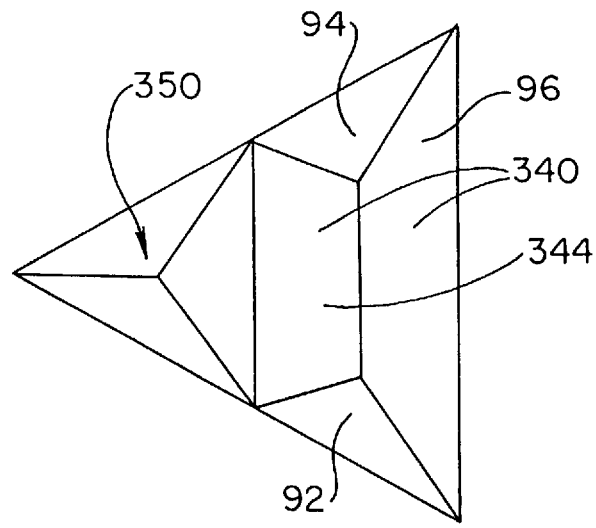
FIG. 15a is an enlarged view of a portion of the retroreflective article of FIG. 15.

Although the difference in ratios of dual axis retroreflection to three axis retroreflection is described above as being generally based on the relative amounts of surface area devoted to the dual axis and three axis retroreflective structures, it should be understood that surface area alone may not be completely indicative of the relative amounts of dual axis retroreflection and three axis retroreflection exhibited by any given retroreflective article. For example, an enlarged view of a portion of the retroreflective article 330 is seen in FIG. 15a. The retroreflective article 330 includes retroreflective cube corner elements 350 and dual axis retroreflective facet pairs 340. In some instances, the surfaces of the facet pairs 340 can combine to form a three axis retroreflective structure. For example, facets 92, 94, and 96 are mutually perpendicular and can provide three axis retroreflection in some cases (as with a cube corner element). Although such retroreflective structures may be limited, they can, nevertheless be the source of some three axis retroreflection that cannot be determined based on a surface area calculation alone.

Figure 16:
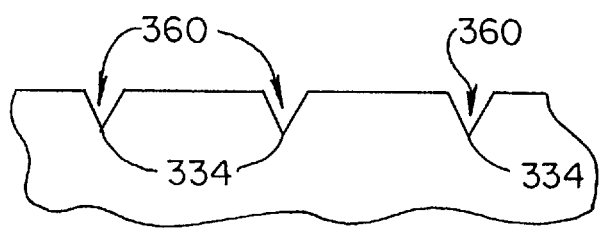
FIG. 16 is a schematic diagram of the machining pattern cut from the direction indicated by line 16—16 in FIG. 15.
Figure 17:
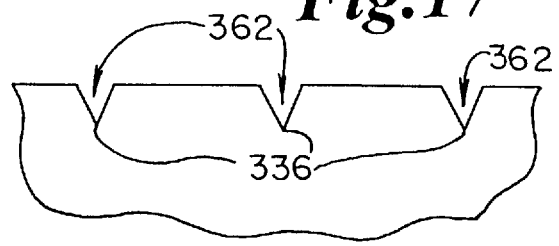
FIG. 17 is a schematic diagram of the machining pattern cut from the direction indicated by line 17—17 in FIG. 15.
Figure 18:
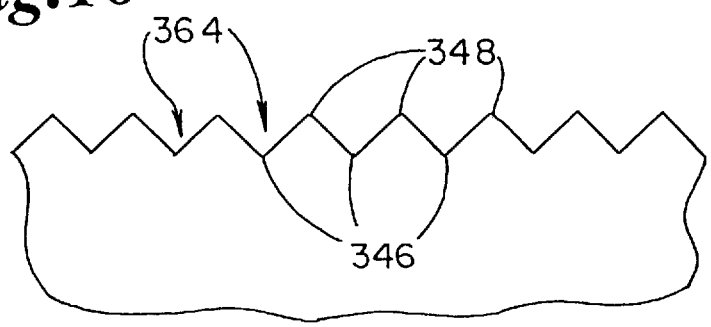
FIG. 18 is a schematic diagram of the machining pattern cut from the direction indicated by line 18—18 in FIG. 15.

FIGS. 16–18 depict the cuts or grooves that could be machined into a substrate to either directly machine a retroreflective article 330 or to form a mold for replicating retroreflective articles 330. FIG. 16 depicts the spaced grooves 360 that would be formed along lines 334 in retroreflective article 330. FIG. 17 depicts the spaced grooves 362 that would be formed along lines 336 in retroreflective article 330. FIG. 18 depicts the grooves 364 that would be formed along lines of intersection 346 and valleys 348 in retroreflective article 330. The tool used to form grooves 364 preferably has a tip with a 90 degree angle to form the perpendicular facets 342 and 344 in the facet pairs 340.

FIGS. 19–22 depict another dual axis retroreflective article 430 according to the present invention in which two planes of retroreflection are provided along with three axis retroreflection. The retroreflective article 430 provides two planes of retroreflection defined by lines 434 and 438 in retroreflective article 430 along with three axis retroreflection from retroreflective cube corner elements 450.

The first plane of retroreflection is perpendicular to lines 434 and is provided by the plurality of facet pairs between each adjacent pair of lines 434. For example, facets 472 and 476 form one facet pair that provides dual axis retroreflection in the first plane of retroreflection.

The second plane of retroreflection is perpendicular to lines 438 in retroreflective article 430 and it is provided by the plurality of facet pairs between each adjacent pair of lines 438. For example, facets 470 and 474 form one facet pair that provides dual axis retroreflection in the second plane of retroreflection. The structure formed by facets 470, 472, 474 and 476 is pyramid shaped, and inspection of retroreflective article 430 will reveal a plurality of similar structures throughout retroreflective article 430.

Figure 19:
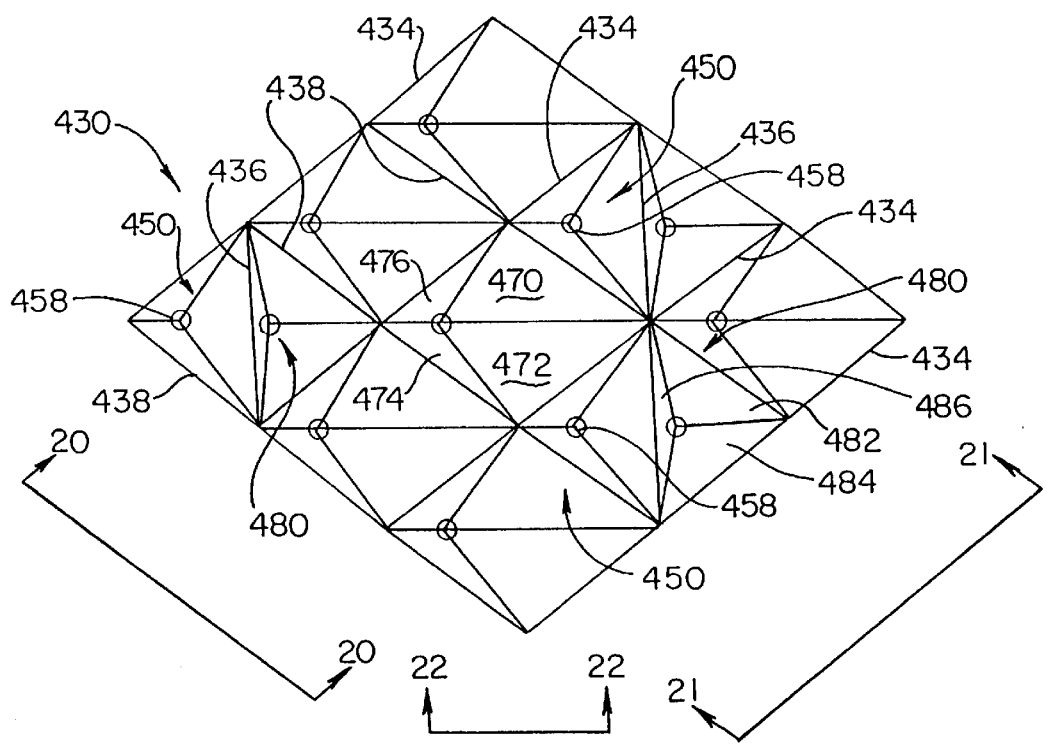
FIG. 19 is a plan view of a portion of a retroreflective article including both dual axis retroreflective facet pairs and cube corner retroreflective elements.

The retroreflective article 430 provides three axis retroreflection from a plurality of retroreflective cube corner elements 450 with apexes 458 as noted in FIG. 19. The cube corner elements 450 are formed along one side of the grooves represented by lines 436.

The retroreflective article 430 also includes trihedral structures 480 that are not three axis retroreflective directly opposite each of the retroreflective cube corner elements 450 across lines 436. The structures 480 are not three axis retroreflective because surfaces 480, 482, and 484 are not mutually perpendicular. As a result, those structures 480 are not three axis retroreflective, but do reflect incident light and, therefore, contribute to the sparkling effect exhibited by some of the retroreflective articles according to the present invention. Two of the surfaces 480, 482 and 484 may be perpendicular to each other and, as a result, they may define an additional plane of dual axis retroreflection that can contribute to the conspicuity of the article 430.

Figure 20:
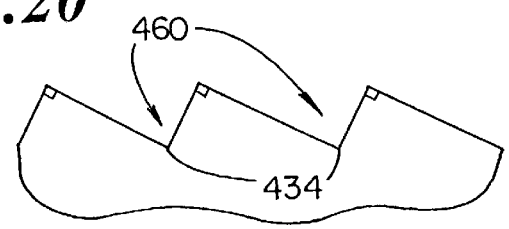
FIG. 20 is a schematic diagram of the machining pattern cut from the direction indicated by line 20—20 in FIG. 19.
Figure 21:
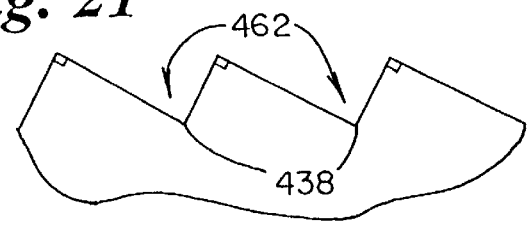
FIG. 21 is a schematic diagram of the machining pattern cut from the direction indicated by line 21—21 in FIG. 19.
Figure 22:
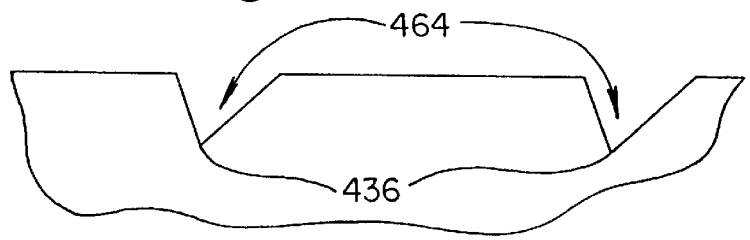
FIG. 22 is a schematic diagram of the machining pattern cut from the direction indicated by line 22—22 in FIG. 19.

FIGS. 20–22 depict the cuts or grooves that could be machined into a substrate to either directly machine a retroreflective article 430 or to form a mold for replicating retroreflective articles 430. FIG. 20 depicts the spaced grooves 460 that would be formed along lines 434 in retroreflective article 430. FIG. 21 depicts the spaced grooves 462 that would be formed along lines 438 in retroreflective article 430. FIG. 22 depicts the grooves 464 that would be formed along lines 436 in retroreflective article 430. The tool used to form grooves 460 and 462 preferably has a tip with a 90 degree angle to form the perpendicular facets in the facet pairs located between lines 434 and 438.

Figure 23:
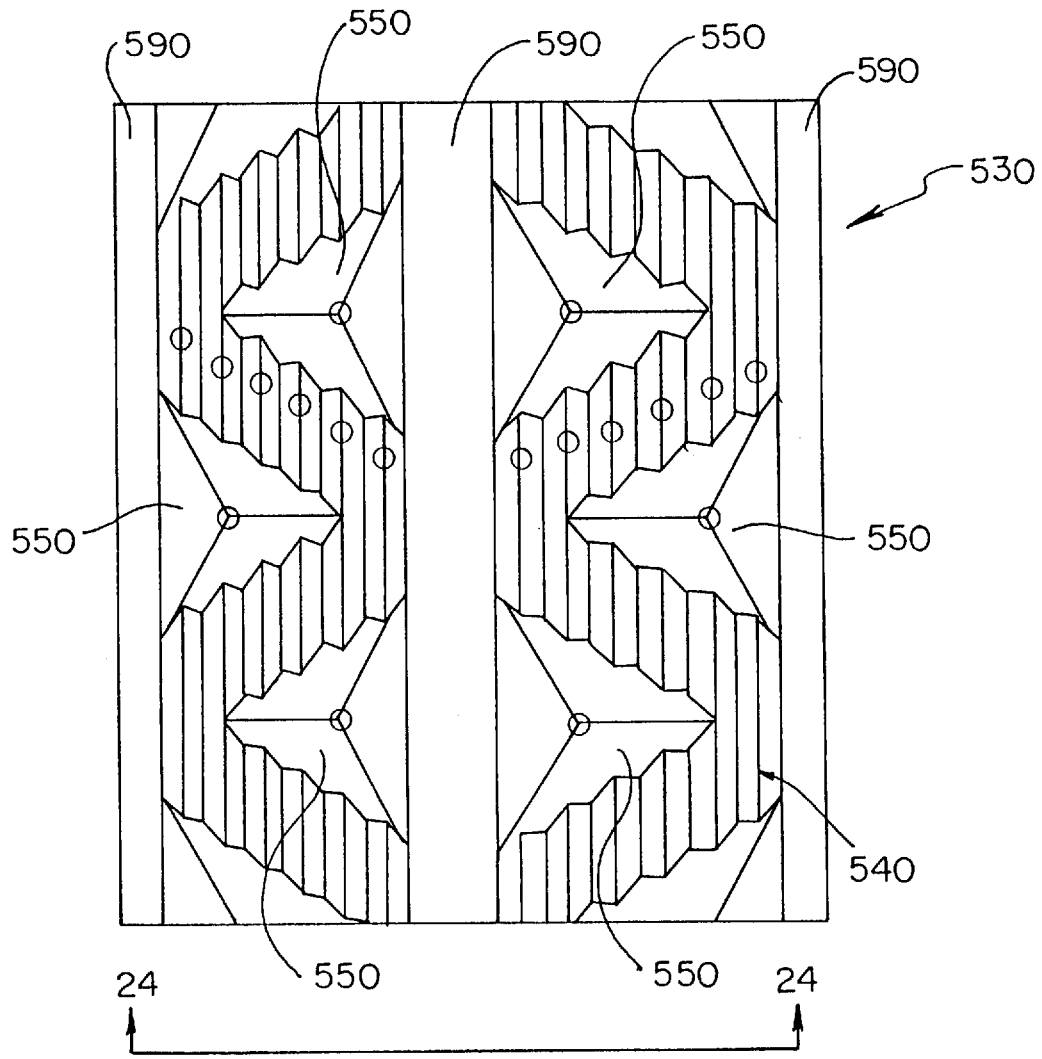
FIG. 23 is a plan view of a portion of a retroreflective article including both dual axis retroreflective facet pairs and cube corner retroreflective elements.
Figure 24:
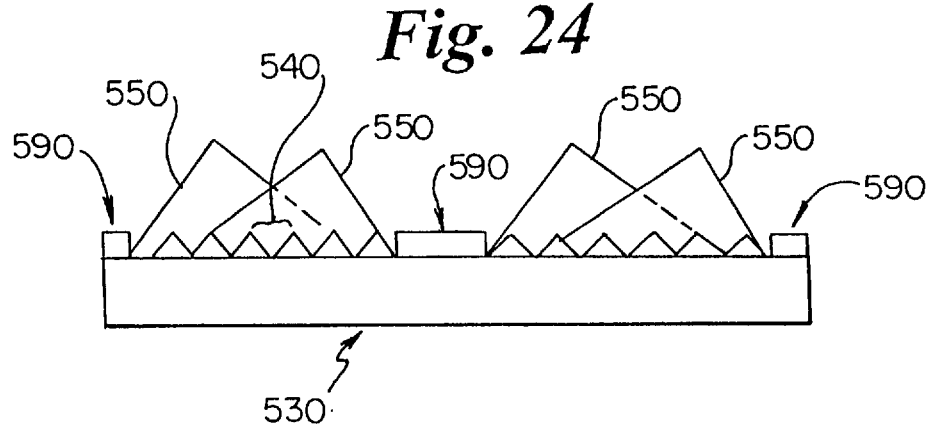
FIG. 24 is a side view of the retroreflective article of FIG. 23, taken from the direction indicated by line 24—24 in FIG. 23.

FIGS. 23 and 24 depict another alternate embodiment of a retroreflective article 530 manufactured according to the present invention. The retroreflective article 530 provides three axis retroreflection, dual axis retroreflection and transmission of incident light. The plurality of retroreflective cube corner elements 550 provide three axis retroreflection while the facet pairs 540 provide dual axis retroreflection in a plane perpendicular to the facets forming the facet pairs 540. The transmission of incident light is provided by separation surfaces 590 located between the facet pairs 540 and the retroreflective cube corner elements 550. The separation surfaces 590 preferably increase light transmission or transparency in the retroreflective article. For example, transmissive separation surfaces 590 can be particularly useful for internally illuminated devices such as signs or automotive signal light reflectors. Although the separation surfaces are depicted as planar, it will be understood that they could alternatively be curved and/or include a diffusing surface and other features. The separation surfaces 590 can be formed by a variety of methods including directly machining the retroreflective article 530 with a tool that has a flat or curved tip.

In addition to separation surfaces, retroreflective articles according to the present invention may also include truncated structure edges (such as those formed by facet pairs) as well as truncated cube corner elements. It will be recognized that other structural features could be incorporated within retroreflective articles according to the present invention and that these combinations are not limited to the specific combinations in embodiments depicted in the figures.

Figure 25:
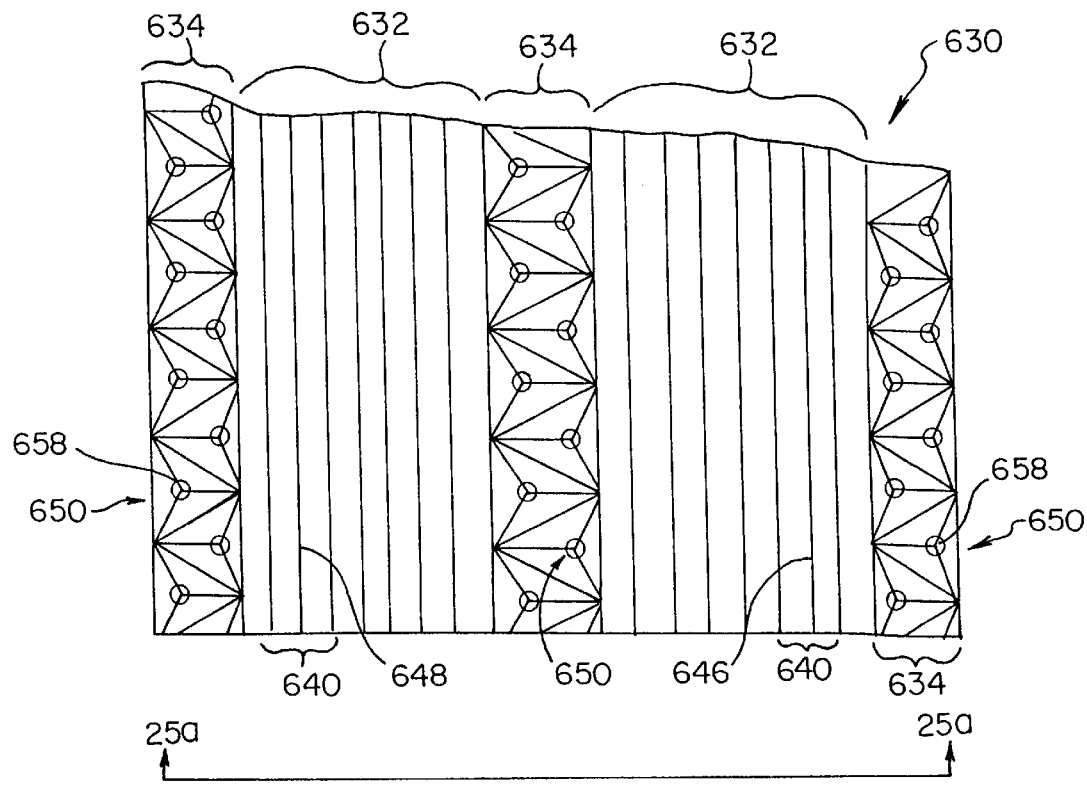
FIG. 25 is a plan view of a portion of a retroreflective article including both dual axis retroreflective facet pairs and cube corner retroreflective elements.
Figure 25A:
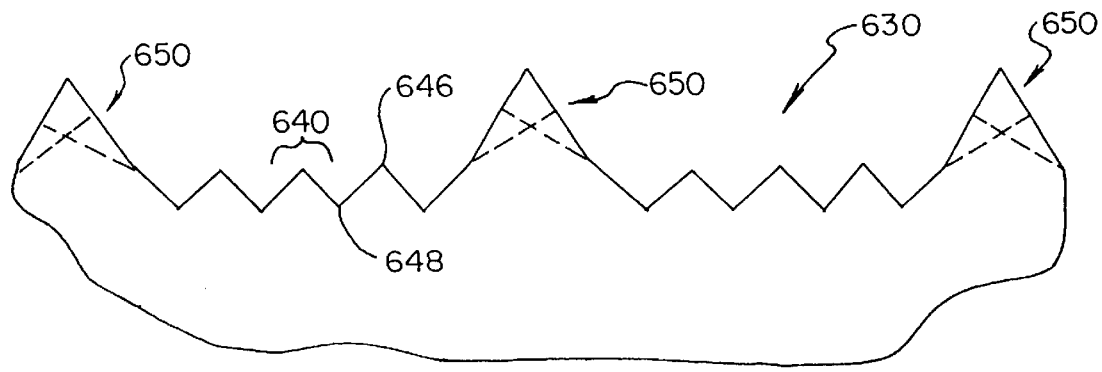
FIG. 25a is a side view of the retroreflective article of FIG. 25, taken from the direction indicated by line 25a—25a in FIG. 25.

FIGS. 25 and 25a depict another alternative embodiment of a retroreflective article 630 manufactured according to the present invention. In the retroreflective article 630, sections 632 of dual axis retroreflective facet pairs 640 are formed along lines of intersection 646. Each of the sections 632 of dual axis retroreflective facet pairs 640 are separated by sections 634 of three axis retroreflective cube corner elements 650 having apexes 658.

The retroreflective article 630 can be formed by recessing the plane in which the facet pairs 640 are located below the plane in which the retroreflective cube corner elements 650 are located. One method of constructing a mold to form the retroreflective article 630 would involve forming the cube corner elements 650, followed by removal of the material in the sections 632 and formation of the facet pairs 640 in the sections 632.

The retroreflective article 630 and the other retroreflective articles including both dual axis and three axis retroreflection can be formed from a single tool as described above. Other methods of forming composite retroreflective articles, such as article 630, could include tiling tools made of each of the two sections 632 and 634 to form a single replication tool. Alternately, sections 632 and 634 could be formed or cut from larger sheets or articles that include only dual axis retroreflective structures (for sections 632) and other larger sheets or articles that include only three axis retroreflective structures (for sections 634). Those separate pieces could then be tiled to form a single retroreflective article 630 by laminating them with, for example, a single overlay film. In another variation, the sections 632 and 634 could be joined by welding or some other method of attaching the sections to form the desired composite.

Although the discussion of retroreflective articles providing both dual axis and three axis retroreflection has focused on the use of retroreflective cube corner elements in combination with dual axis retroreflective structures, it will also be understood that retroreflective articles according to the present invention may rely on beaded retroreflective elements to provide three axis retroreflection in combination with the dual axis retroreflective structures. It will also be understood that bead retroreflective elements may also be combined with other three axis retroreflective structures and dual axis retroreflective structures within the scope of the present invention.

Figure 26:
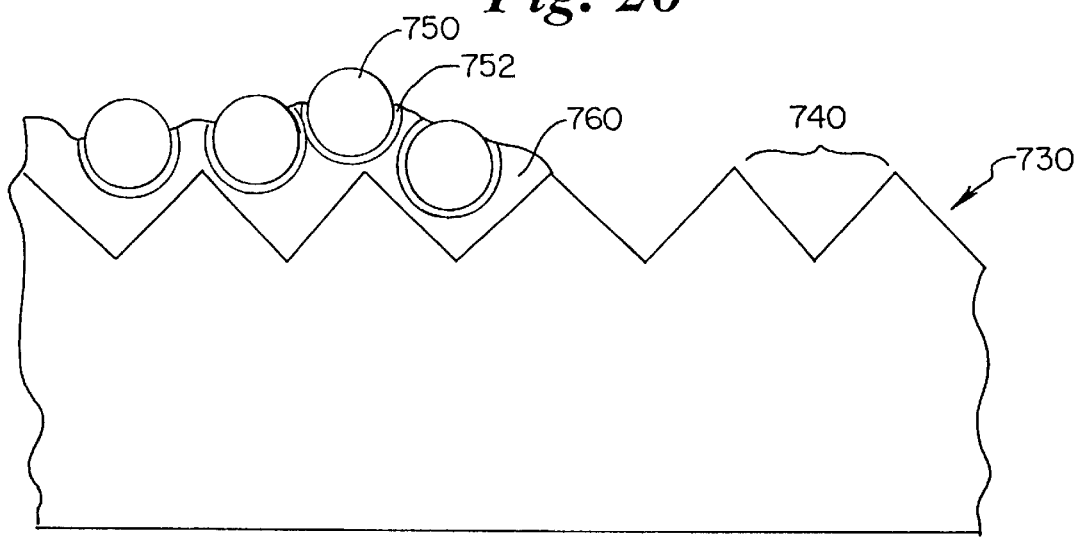
FIG. 26 is a schematic cross-sectional view of a retroreflective article including both dual axis retroreflective facet pairs and three axis retroreflective beads.

One example of a combination of bead retroreflective elements and dual axis retroreflective structures is depicted in FIG. 26 as a retroreflective article 730. The retroreflective article 730 includes both dual axis retroreflective facet pairs 740 as well as three axis retroreflective beads 750 located in binder material 760 deposited on the surface of the retroreflective article 730. The retroreflective article 730 may include a reflective material 752 located between the retroreflective beads 750 and the binder material 760 if desired. The actual materials used for the retroreflective beads 750, optional reflective material 752 and binder material 760 are known to those skilled in the art and will not be described herein. Representative beaded three axis retroreflective systems are discussed in, for example, U.S. Pat. Nos. 4,025,159 to McGrath; 4,983,436 to Bailey et al.; and 5,066,098 to Kult et al.

Figure 27:
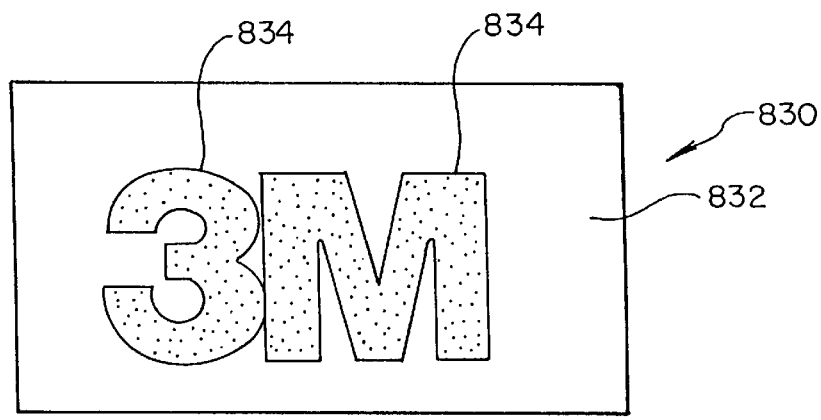
FIG. 27 is a plan view of one retroreflective article according to the present invention.

The combination of both dual axis retroreflective structures with three axis retroreflective structures provides a number of advantages in addition to improving overall conspicuity alone. For example, it may be desirable to form a composite retroreflective article 830 such as that depicted in FIG. 27 in which area 832 is provided of substantially all three axis retroreflective structures to provide a steady glow in response to incident light from, e.g., automobile headlights. In contrast, the areas 834 defined by the alphanumeric letters could be provided with substantially all dual axis retroreflectors such that the message or image formed by areas 834 would appear to flash in response to incident light.

Figure 28:
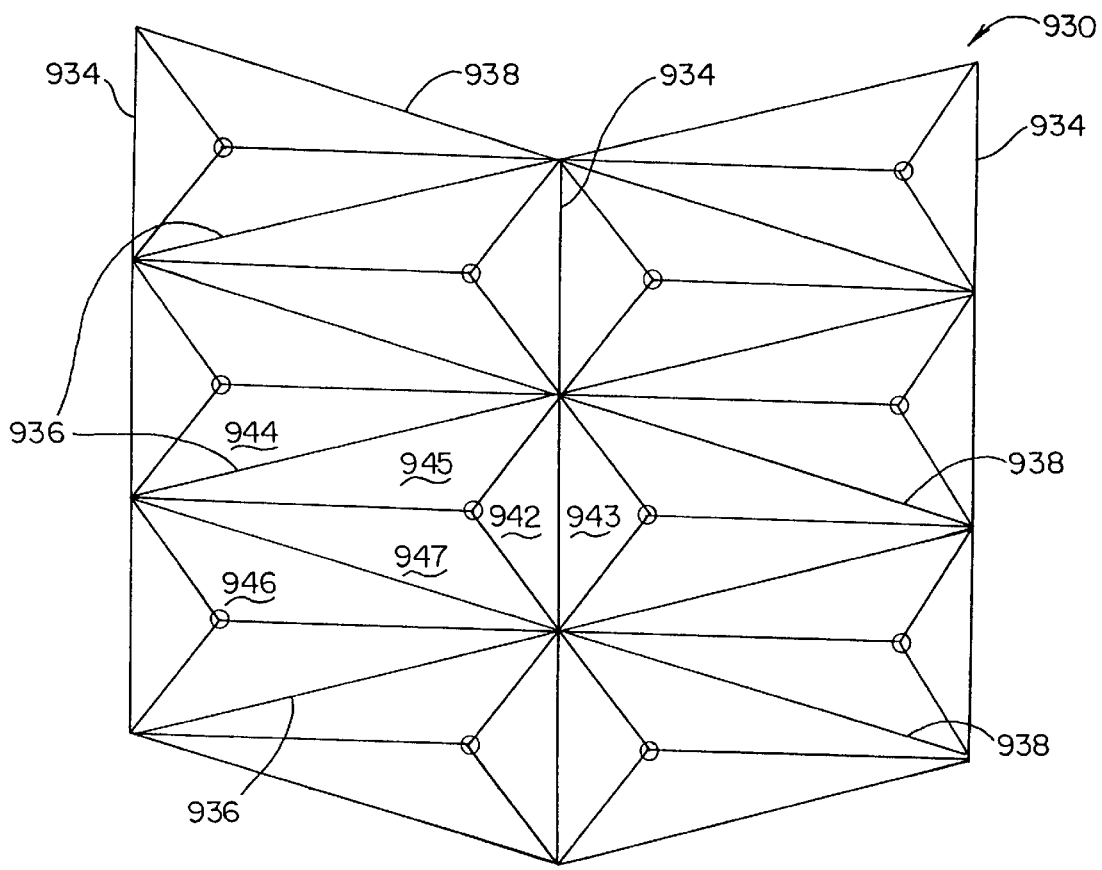
FIG. 28 is a plan view of a portion of a retroreflective article including both dual axis retroreflective facet pairs and/or sparkling reflective elements.

FIG. 28 depicts another alternate embodiment of a dual axis retroreflective article 930 according to the present invention. The retroreflective article 930 provides both dual axis retroreflection and specular reflection. The retroreflective article 930 may also provide three axis retroreflection as do the embodiments described above. The retroreflective article 930 provides asymmetric prisms formed, in this embodiment, by three cuts or grooves in a surface. All of the cuts or grooves are preferably formed using a 90 degree tool so that any facets formed by the tool are perpendicular and result in facet pairs and lines of intersection that define planes of retroreflection as described above.

One set of lines of intersections are lines 934 as shown in FIG. 28. The facets 942 and 943 formed along line 934 are perpendicular, thereby forming a plurality of facet pairs. Lines 936 define another set of lines of intersection in the retroreflective article 930. Facets 944 and 945 are formed along line 936 and are located in perpendicular planes. The facets 944 and 945 are, however, not symmetric about line 936. As a result, incident light may be reflected off of one of the facets 744 and be reflected by a facet 946 that may or may not be perpendicular to the incident facet. If facets 944 and 946 are not perpendicular to each other, the this incident light is reflected in some non-retroreflective direction, resulting in the sparkling effect described above. If facets 944 and 946 are perpendicular, then they may also establish yet another plane of dual axis retroreflection.

Lines 938 define yet another set of lines of intersection in the retroreflective article 930. Facets 946 and 947 are formed along line 938 and are located in perpendicular planes. The facets 946 and 947 are, however, not symmetric about line 938. As above, incident light may be reflected off of one of the facets 946 or 947 and be reflected by a facet that may or may not be perpendicular to the incident facet, thereby adding to the sparkling reflective effect provided by article 930 or establish yet another plane of dual axis retroreflection.

It is important to note that the asymmetric facets pairs, i.e., 944/945 and 946/947, formed in the retroreflective article 930 perform two functions. To some degree they provide dual axis retroreflection of incident light, but they also provide the sparkling reflective structures that may also form a part of the present invention.

Figure 29:
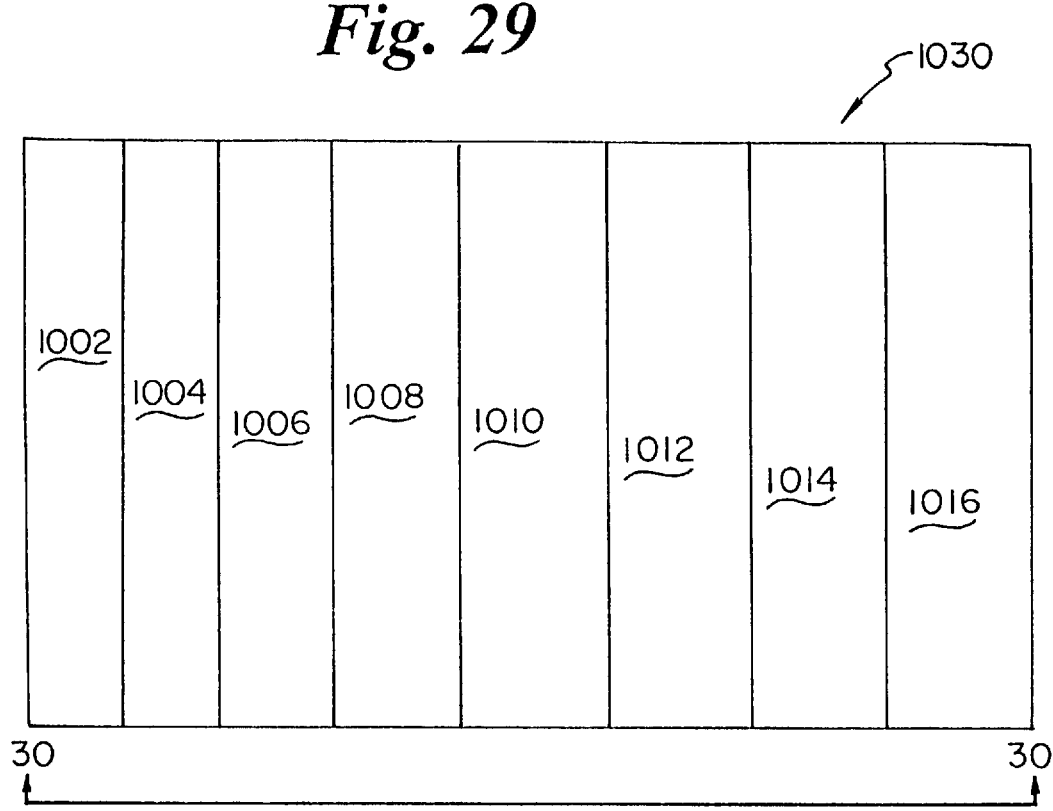
FIG. 29 is a plan view of a portion of a retroreflective article including both dual axis retroreflective facet pairs and sparkling reflective facets.
Figure 30:
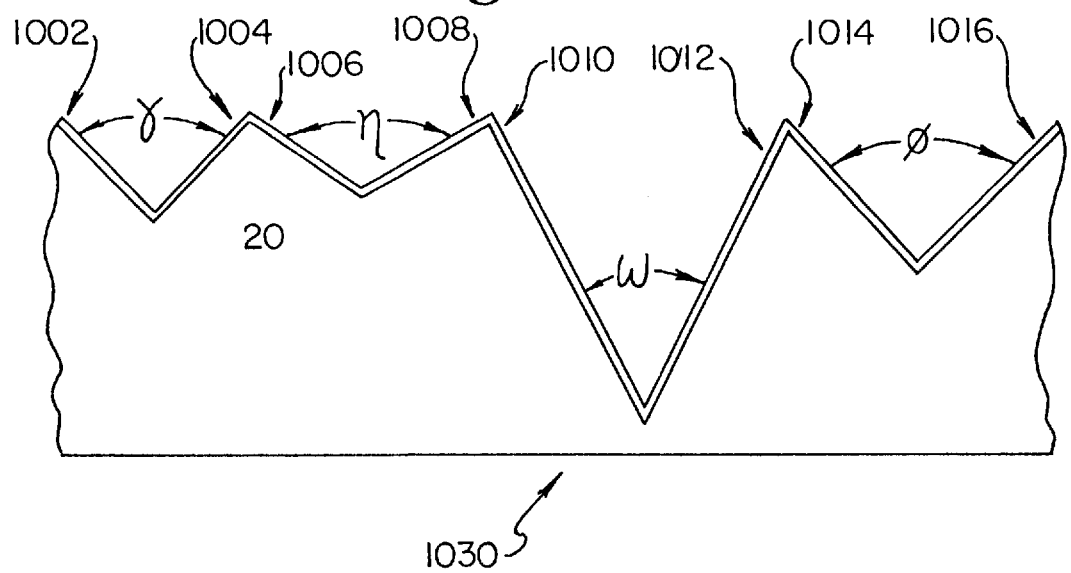
FIG. 30 is a enlarged cross-sectional view of the retroreflective article of FIG. 29, taken from the direction indicated by line 30—30 in FIG. 29.

FIGS. 29 and 30 illustrate an alternate embodiment of a retroreflective article 1030 according to the present invention. The retroreflective article 1030 includes a series of facets 1002–1016 similar to those found in retroreflective articles described above. The facets 1002–1016 can be coated with a reflective material 1020 as discussed above. The retroreflective article 1030 includes two pairs of dual axis retroreflective facets 1002/1004 and 1014/1016 each of which form angles γ of 90 degrees to provide dual axis retroreflectivity.

The retroreflective article 1030 also includes facets 1006, 1008, 1010 and 1012 which, although reflective, do not provide dual axis retroreflectivity as do facet pairs 1002/1004 and 1014/1016. The angle η formed by facets 1006 and 1008 is greater than 90 degrees and the angle o formed between facets 1010 and 1012 is less than 90 degrees. As a result, facets 1006/1008 and 1010/1012 form sparkling reflective facet pairs that reflect incident light, but do not retroreflect incident light as do dual axis or three axis retroreflective structures. It is preferred that sparkling reflective facet pairs are not generally perpendicular as are dual axis retroreflective facet pairs to avoid forming dual axis retroreflective facet pairs. In one preferred embodiment, sparkling facet pairs will form included angles that are greater than about 80 degrees and less than about 100 degrees.

Retroreflective articles according to the present invention can be manufactured by replication using molds formed by many different methods, including those typically referred to as pin bundling and direct machining. Molds manufactured using pin bundling are made by assembling together individual pins, each of which have an end portion shaped with the desired features of the retroreflective article. Examples of pin bundling are described in, e.g., U.S. Pat. No. 3,926,402 to Heenan et al., and United Kingdom Pat. Nos. 423,464 and 441,319 to Leray. The direct machining technique, sometimes referred to as ruling, involves cutting portions of a substrate to create a pattern of grooves that intersect to form retroreflective structures. Examples of such ruling, shaping and milling techniques are described in U.S. Pat. Nos. 3,712,706 (Stamm); 4,349,598 (White); 4,588,258 (Hoopman); 4,895,428 (Nelson et al.); 4,938,563 (Nelson et al.). Although the retroreflective articles of the present invention described herein will generally be manufactured from molds formed by direct machining, it will be understood that any other suitable methods could be used.

The retroreflective articles according to the present invention can be provided in macro- or micro-structured form (or a combination of both) and will typically exhibit the retroreflective and reflective properties discussed above in any form. Macro-structured articles can be provided from many different materials and in any appropriate dimensions depending on the intended application or use of the articles. Micro-structured articles will typically include small facet pairs, preferably about 16 facet pairs or more per centimeter (about 40 facet pairs or more per inch), although in some instances it may be preferable to provide about 28 facet pairs or more per centimeter (about 70 facet pairs per inch). It may further be advantageous to use thin micro-structured sheeting incorporating the structures described above in some situations. The thin micro-structured sheeting may more preferably be flexible as described in, for example, U.S. Pat. No. 4,906,070 (Cobb, Jr.) to facilitate its attachment or conformance to, e.g., uneven surfaces, curved surfaces, clothing, shoes, etc.

Suitable materials for retroreflective articles according to the present invention can vary, although the articles will typically be manufactured from transparent materials that are dimensionally stable, durable, weatherable, and easily replicated in the desired configuration. Examples of suitable materials include glass, acrylics with an index of refraction of about 1.5 (e.g., PLEXIGLASS brand resin from Rohm & Haas Company), polycarbonates with an index of refraction of about 1.59, polyethylene based ionomers (e.g., SURLYN brand from E.I. DuPont de Nemours and Co., Inc.), polyesters, polyurethanes, and cellulose acetate butyrates. Other examples include reactive materials such as those taught in U.S. Pat. Nos. 4,576,850; 4,582,885; and 4,668,558.

Polycarbonates are particularly preferred for transparent articles because of their toughness, temperature stability, and relatively higher refractive index (about 1.59) which generally contributes to improved retroreflective performance over a wider range of entrance angles when using second surface reflectors. The higher index of refraction provides a larger index of refraction difference to enhance total internal reflection at structure surface. In some instances where transmission of light through the retroreflective article, using, e.g., separation surfaces or truncated structures, it may be desirable to use materials with lower indices of refraction to improve the range of light transmitted through the article. For example, where transmission is important, acrylics (with an index of refraction of about 1.5) may offer an advantageous combination of properties. The materials use to form retroreflective articles may also include UV stabilizers or other additives to improve their weatherability, durability, toughness or any other desired property.

Also, although transparent materials are preferred for the manufacture of retroreflective articles according to the present invention, it will be understood that first surface retroreflective articles of the present invention could be provided from opaque materials that may include a reflective coating as needed to enhance their reflective properties. Such coatings could include a metal or a dielectric stack. Also, even transparent materials could be partially or completely coated with materials to enhance their reflectivity and such combinations could be used in either first or second surface retroreflective articles according to the present invention.

Because of the dual nature of the retroreflection provided by the retroreflective articles that include dual axis retroreflective structures and three axis retroreflective structures, it may be advantageous to provide the retroreflective articles according to the present invention with one or more dyes, colorants, or pigments to enhance the conspicuity of the retroreflective articles. As used herein, the term "coloring agent" will be used to refer to any dye, colorant, pigment, etc. used to effect a visible color change in the retroreflective articles according to the present invention.

In one example, the retroreflective article 630 depicted in FIG. 25 and described above could be provided as a composite of sections that are tiled together to form the completed retroreflective article 630. The sections 632 that provide dual axis retroreflection could be provided with an overlay film including a coloring agent incorporated therein or printed thereon,. Alternatively, a coloring agent could be incorporated into the material forming the section 632 of the retroreflective article 630 itself before curing. The use of overlay films to seal retroreflective structures and provide color to the same as well as the incorporation of coloring agents into reflective structures are both well known to those of skill in the art and will not be described herein.

For additional contrast between the dual axis retroreflection provided by the facet pairs 640, the sections 634 of retroreflective cube corner elements 650 could retroreflect light with a different color than that exhibited by the light retroreflected from the facet pairs 640 in section 632. The additional coloring could be provided with an overlay film including a different coloring agent over section 634 of the retroreflective article 630, or alternatively, a coloring agent could be incorporated into the material forming the retroreflective cube corner elements 650 of section 634 itself before curing. U.S. Pat. Nos. 5,272,562 to Coderre and 5,450,235 to Smith et al. discuss various methods of introducing coloring agents into retroreflective articles which could be useful in connection with the present invention.

The patents, patent documents, and publications cited herein are incorporated by reference in their entirety, as if each were individually incorporated by reference. Various modifications and alterations of this invention will become apparent to those skilled in the art without departing from the scope of this invention, and it should be understood that this invention is not to be unduly limited to the illustrative embodiments set forth herein.

What is claimed is:

1. A retroreflective article comprising:
   at least one facet pair comprising two facets located in perpendicular facet planes, the facet planes of each facet pair intersecting along a line of intersection;
   a plane of retroreflection extending out of the retroreflective article for each of the facet pairs, the plane of retroreflection being perpendicular to both of the facet planes of each of the facet pairs; whereby the retroreflective article exhibits dual axis retroreflection in each of the planes of retroreflection; and
   at least one three axis retroreflective structure, whereby the retroreflective article exhibits three axis retroreflection of incident light from the three axis retroreflective structures.

2. An article according to claim 1, wherein the three axis retroreflective structures comprise beads.

3. An article according to claim 1, wherein the three axis retroreflective structures comprise cube corner retroreflective elements.

4. An article according to claim 1, further comprising a plurality of retroreflective facet pairs, wherein the lines of intersection of at least some of the plurality of retroreflective facet pairs are generally parallel to each other.

5. An article according to claim 4, wherein the lines of intersection of at least some of the plurality of retroreflective facet pairs are generally perpendicular to each other.

6. An article according to claim 1, wherein the retroreflective article comprises a completely integral, one piece structure with the facet pairs and the three axis retroreflective structures formed in the completely integral, one piece structure.

7. An article according to claim 1, wherein the retroreflective article comprises a composite structure, with the facet pairs being located in a first component of the composite structure and the plurality of three axis retroreflective structures being located in a second component of the composite structure, and further wherein the first and second components combine to form the composite structure.

8. An article according to claim 1, wherein a plurality of the facet pairs are arranged to form at least one visible image surrounded by at least some of the plurality of three axis retroreflective structures.

9. An article according to claim 1, wherein at least some of the plurality of three axis retroreflective structures are arranged to form at least one visible image surrounded by a plurality of the facet pairs.

10. An article according to claim 1, wherein the retroreflective article includes a reflective coating on at least a portion of the article.

11. An article according to claim 1, wherein the retroreflective article comprises a coloring agent generally proximate at least one of the facet pairs.

12. An article according to claim 1, wherein the retroreflective article comprises a coloring agent generally proximate at least one of the three axis retroreflective structures.

13. An article according to claim 1, wherein the retroreflective article comprises at least two coloring agents of different colors.

14. An article according to claim 1, wherein a first coloring agent is generally proximate the facet pairs and a second coloring agent is generally proximate the three axis retroreflective structures.

15. An article according to claim 1, wherein the retroreflective article further comprises a plurality of sparkling reflective structures, whereby incident light striking the sparkling reflective structures is reflected from the retroreflective article.

16. An article according to claim 15, wherein the sparkling reflective structures comprise a plurality of sparkling facet pairs, each of the sparkling facet pairs comprising two sparkling facets located in sparkling facet planes that are not perpendicular.

17. An article according to claim 16, wherein the included angle formed by each of the sparkling facet planes is between about 80 degrees to about 100 degrees.

18. A retroreflective article comprising:
    a completely integral, one piece body;
    a plurality of facet pairs formed in the body, each of the facet pairs comprising two facets located in perpendicular facet planes, the facet planes of each facet pair intersecting along a line of intersection;
    a plane of retroreflection extending out of the retroreflective article for each of the facet pairs, the plane of retroreflection being perpendicular to both of the facet planes of each of the facet pairs; whereby the retroreflective article exhibits dual axis retroreflection in each of the planes of retroreflection;
    a plurality of three axis retroreflective structures formed in the body, at least some of the three axis retroreflective structures comprising cube corner retroreflective elements, whereby the retroreflective article exhibits three axis retroreflection of incident light from the three axis retroreflective structures; and
    a coloring agent generally proximate at least one of the plurality of facet pairs and the plurality of three axis retroreflective structures.

19. A retroreflective article comprising:
    at least one facet pair comprising two facets located in perpendicular facet planes, the facet planes of each facet pair intersecting along a line of intersection;

a plane of retroreflection extending out of the retroreflective article for each of the facet pairs, the plane of retroreflection being perpendicular to both of the facet planes of each of the facet pairs; whereby the retroreflective article exhibits dual axis retroreflection in each of the planes of retroreflection; and at least one sparkling reflective structure, each of the sparkling reflective structures comprising a plurality of sparkling facet pairs, each of the sparkling facet pairs comprising two sparkling facets located in sparkling facet planes that are not perpendicular to each other, whereby incident light striking the sparkling reflective structures is reflected from the retroreflective article.

20. An article according to claim 19, wherein the included angle formed by the sparkling facet planes is between about 80 degrees to about 100 degrees.

21. An article according to claim 19, further comprising at least one three axis retroreflective structure, whereby the retroreflective article exhibits three axis retroreflection of incident light from the three axis retroreflective structures.

22. A method for improving the conspicuity of an object by providing intermittent dual axis retroreflection of incident light comprising:

providing a dual axis retroreflective article having at least one plane of dual axis retroreflection;

locating the retroreflective article on an object; and providing relative motion between at least two of the retroreflective article, a light source and an observer, whereby at least one of the planes of retroreflection passes proximate the observer and the light source.

23. A method according to claim 22, wherein the dual axis retroreflective article comprises at least one facet pair having two facets located in generally perpendicular facet planes, the facet planes of each facet pair intersecting along a line of intersection.

24. A method according to claim 22, wherein the relative motion comprises passing at least one plane of dual axis retroreflection through at least one of the observer and the light source.

25. A method according to claim 22, wherein moving the retroreflective article comprises rotating the article about an axis.

26. A method according to claim 22, wherein moving the retroreflective article comprises translating the article relative to at least one of the light source and the observer.

27. A method according to claim 22, wherein moving the retroreflective article comprises moving at least one of the facet pairs such that the observer and light source are located at equal angles above and below the plane of retroreflection of the facet pair and on a specular plane of reflection defined by the facet pair.

28. A method according to claim 22, wherein locating the retroreflective article comprises attaching the retroreflective article to clothing.

29. A method according to claim 22, wherein locating the retroreflective article comprises attaching the retroreflective article to a vehicle.

30. A method according to claim 22, further comprising providing three axis retroreflection from at least one three axis retroreflective structure forming a part of the retroreflective article.

* * * * *